(12) United States Patent
Osaka

(10) Patent No.: US 6,424,380 B1
(45) Date of Patent: Jul. 23, 2002

(54) DIGITAL BROADCAST RECEIVING APPARATUS FOR DISPLAYING STILL IMAGES AT HIGH SPEED

(75) Inventor: Masataka Osaka, Osaka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/104,734

(22) Filed: Jun. 25, 1998

(30) Foreign Application Priority Data

Jun. 25, 1997 (JP) .............................................. 9-168407

(51) Int. Cl.$^7$ ........................... H04N 5/44; H04N 5/445
(52) U.S. Cl. ........................ 348/553; 348/24; 348/563; 348/564
(58) Field of Search ....................... 348/24, 553, 563, 348/564, 584, 589, 598, 600, 906, 569; 725/41, 135, 139; H04N 5/44, 5/445, 9/74, 9/76

(56) References Cited

U.S. PATENT DOCUMENTS 6,115,080 A * 9/2000 Reitmeier .................... 348/564
6,169,543 B1 * 1/2001 Wehmeyer .................. 348/564
6,212,680 B1 * 4/2001 Tsinberg et al. ............ 348/563

* cited by examiner

Primary Examiner—Sherrie Hsia
(74) Attorney, Agent, or Firm—Price and Gess

(57) ABSTRACT

A digital broadcast receiving apparatus, for receiving a plurality of pieces of compressed still image data repeatedly transmitted from a digital broadcast transmitting apparatus and for outputting a still image selected by a user as a TV signal, fetches still image data into a main memory prior to a selecting operation made by the user, expands still image data of a still image selected by the user using an AV decoder of an MPEG decoder, and outputs an image signal of the selected still image according to the expanded still image data.

13 Claims, 19 Drawing Sheets

| IDENTIFICATION NUMBER | PARENT | CHILD | SIZE |
|---|---|---|---|
| 1 | 0 | 2,4,5,7,11,50 | 15072 |
| 2 | 1 | 3 | 15168 |
| 3 | 2 | 0 | 15360 |
| 4 | 1 | 0 | 14400 |
| 5 | 1 | 6 | 14304 |
| 6 | 5 | 0 | 15840 |
| 7 | 1 | 8,9 | 14016 |
| 8 | 7 | 0 | 15456 |
| 9 | 7 | 10 | |

DIGITAL BROADCAST RECEIVING APPARATUS FOR DISPLAYING STILL IMAGES AT HIGH SPEED

BACKGROUND OF THE INVENTION (1) Field of the Invention

The present invention relates to a digital broadcast receiving apparatus, and in particular to a receiving apparatus for receiving and displaying data such as image data which has been subjected to digital compression.

(2) Related Art

In recent years, digital broadcasts which transmit video and audio data via transmission means such as satellites and CATVs (Community Antenna Televisions) have been performed.

Research into still image information providing services, where a plurality of inter-related still images are transmitted using a digital broadcast and users performs interactive operations to view their desired still images out of the plurality of still images, has also been performed.

The following is a description of the operation for using such a still image information providing service, with reference to FIG. 1.

FIG. 1 shows an operation image for selecting a still image.

When the "SERVICE MENU" still image 11 is displayed and a user selects the "4, WEATHER FORECAST" item, the "WEATHER FORECAST" still image 12 is displayed.

The following is a description of a conventional technique for providing this still image information providing service, with reference to FIGS. 1–3.

FIG. 2 shows a representation of still image data transmitted from a digital broadcast transmitting apparatus.

The digital broadcast transmitting apparatus repeatedly transmits compressed data of a plurality of still images.

The drawing shows a state where the first still image is the "SERVICE MENU" still image 11 and the seventh still image is the "WEATHER FORECAST" still image 12, among the data 20 of 150 still images which is transmitted repeatedly.

FIG. 3 is a block diagram showing the structure of the conventional digital broadcast receiving apparatus 100.

The conventional digital broadcast receiving apparatus 100 receives data transmitted from a digital broadcast transmitting apparatus and displays still images according to operations made by the user. The conventional digital broadcast receiving apparatus 100 includes the tuner & demodulator 102, the transport decoder 103, the local memory 104, the MPEG (Moving Picture Experts Group) decoder 105, the local memory 106, the CPU 109 for controlling each unit of the apparatus according to an operation made by the user, and the main memory 110.

The tuner & demodulator 102 receives data 101 transmitted from the digital broadcast transmitting apparatus according to a station selecting operation, such as a selecting operation of a satellite, made by the user, demodulates the received data 101, and inputs the demodulated data into the transport decoder 103.

The transport decoder 103 separates and extracts a transport stream indicated by the CPU 109 from the data inputted from the tuner & demodulator 102.

Note that the transmitted data 101 is transport streams which are obtained by subjecting a plurality of coded streams to a time-division multiplexing using packets of relatively short fixed length.

There are several stream types of the transport streams, such as "image", "audio", and "data".

When the stream type is "image" or "audio", the transport decoder 103 inputs picture or audio data of this transport stream into the MPEG decoder 105, and the MPEG decoder 105 expands the picture or audio data and display the expanded picture or audio data. It should be noted here that in this specification, pictures include still images and video images.

When the stream type is "data", the transport decoder 103 stores the data of the "data" transport stream in the local memory 104 attached to the transport decoder 103. The data stored in the local memory 104 can be accessed by the CPU 109.

The conventional digital broadcast receiving apparatus 100 expands and displays still image data transmitted from the digital broadcast transmitting apparatus as the "image" stream type using the MPEG decoder 105. Not all still images that have been transmitted are displayed, with only one out of the transmitted still image being displayed according to a selecting operation made by the user. More specifically, the CPU 109 controls the MPEG decoder 105 according to the selecting operation made by the user so as to freeze the display state when a selected still image is displayed. When the CPU 109 does not perform a specific control, a plurality of pieces of still image data which have been transmitted repeatedly are inputted into the MPEG decoder 105 and the MPEG decoder 105 displays all still images repeatedly like video images.

The conventional digital broadcast transmitting apparatus transmits still images as the "image" stream type and data concerning relations among still images as the "data" stream type to allow the digital broadcast receiving apparatus 100 to perform the above process.

The data concerning relations among still images is information indicating relations among still images using identifiers assigned to each still image. This data indicates, for instance, that the "SERVICE MENU" still image 11 and the "WEATHER FORECAST" still image 12 in FIG. 1 are related to each other. The data concerning relations among still images is hereinafter called still image relation data.

In the digital broadcast receiving apparatus 100, the transport decoder 103 stores the still image relation data transmitted from the digital broadcast transmitting apparatus in the local memory 104. The CPU 109 accesses the local memory 104 and stores the still image relation data in the main memory 110.

The transport decoder 103 inputs compressed still image data transmitted from the digital broadcast transmitting apparatus into the MPEG decoder 105 via the compressed data stream input port 107.

The MPEG decoder 105 includes the serial-parallel conversion circuit 111 for converting a data signal inputted from the transport decoder 103 into an 8-bit parallel signal, the AV decoder 113 for expanding picture and audio data stored in the local memory 106 and storing the expanded data in the local memory 106, and the display circuit 114 for displaying the expanded data stored in the local memory 106.

Therefore, compressed still image data inputted into the MPEG decoder 105 is stored in the local memory 106, is expanded by the AV decoder 113, is stored back into the local memory 106, and is displayed by the display circuit 114. It should be noted here that the display by the MPEG decoder 105 means the output of signals for TV output. On receiving an operation made by the user, the CPU 109 refers to the still image relation data stored in the main memory 110, obtains the identifier of the still image selected by the user, and instructs the MPEG decoder 105 to display the still image of the identifier and to freeze the display screen when the still image is displayed.

When the still image 11 in FIG. 1 is displayed and the user selects the "4. WEATHER FORECAST" item, for instance, the CPU 109 obtains the identifier of the still image corresponding to the "4. WEATHER FORECAST" item by referring to the main memory 110, informs the MPEG decoder 105 of the obtained identifier, and instructs the MPEG decoder 105 to display the still image 12 and to freeze the display screen at the state where the still image 12 is displayed.

On receiving this instruction from the CPU 109, the MPEG decoder 105 checks the compressed still image data that is transmitted thereafter and freezes the display state when the still image 12 is displayed.

In this manner, the conventional digital broadcast receiving apparatus 100 allows the user to view necessary still images by performing interactive operations.

However, there is a problem that the conventional digital broadcast receiving apparatus takes a long time to display still images selected by the user.

When data of 150 still images is repeatedly transmitted from the digital broadcast transmitting apparatus, for instance, there is a time lag of up to the time necessary to send the data of all 150 still images between the time when the user selects a still image and the time when the selected still image is displayed. If five seconds are necessary to transmit the data of 150 still images, the user has to wait up to five seconds to see the selected still image.

SUMMARY OF THE INVENTION

The object of the present invention is to provide a digital broadcast receiving apparatus which realizes a still image information providing service with a good response, that is, which increases the probability that a still image selected by a user will be displayed at high speed.

The above object is achieved by a digital broadcast receiving apparatus for receiving a plurality of pieces of still image data which are repeatedly transmitted from a digital broadcast transmitting apparatus and for displaying a still image selected by a user, the receiving apparatus including: a storage unit; a receiving unit for sequentially receiving the plurality of pieces of still image data; a prediction unit for predicting at least one piece of still image data which is likely to be specified by the user before the user specifies the piece of still image data; a still image fetching unit for fetching, into the storage unit, every piece of still image data that has been predicted by the prediction unit out of the plurality of pieces of still image data received by the receiving unit; an operation accepting unit for accepting a selecting operation of a still image by the user, the selecting operation specifying a piece of still image data corresponding to the selected still image; and a display unit for processing the specified piece of still image data out of the still image data in the storage unit and for displaying a still image according to the processed still image data.

With the above structure, when a plurality of pieces of still image data are transmitted from the digital broadcast transmitting apparatus, the digital broadcast receiving apparatus of the present invention receives the plurality of pieces of still image data, predicts at least one piece of still image data which is likely to be selected by the user, and stores the predicted still image data in the storage unit prior to the selecting operation made by the user, thereby increasing the probability that a still image selected by the user will be displayed at high speed.

In the digital broadcast receiving apparatus, the receiving unit may further receive link information and store the link information in the storage unit, the link information showing which still images are selectable by the user during a display of each still image, and the prediction unit may predict at least one piece of still image data which is likely to be specified by the user by referring to the link information stored in the storage unit.

With the above structure, the digital broadcast receiving apparatus of the present invention receives information showing which still images can be selected by the user while a still image is being displayed, that is, link information showing link relations among still images. Still image data which should be stored in the storage unit can be predicted by referring to the link information so that, for instance, data of non-linked still images does not need to be stored in the storage unit, reducing the storage capacity in the storage unit for storing still image data.

In the digital broadcast receiving apparatus, the prediction unit may refer to the link information and a still image currently being displayed, and predict at least one piece of still image data which is likely to be specified in a following selecting operation.

With the above structure, on recognizing a still image selected by the user, the digital broadcast receiving apparatus of the present invention predicts still images which are likely to be selected by the user in the next selecting operation or other next selecting operations by referring to the link information.

Therefore, still image data is stored in the storage unit beforehand according to the prediction, thereby increasing probability that a still image selected by the user will be displayed at high speed. Also, prediction of still images which are likely to be selected by the user minimizes the number of pieces of still image data that need to be stored in advance to realize rapid display of still images. As a result, capacity in the storage unit for storing still image data can be minimized.

In the digital broadcast receiving apparatus, the operation accepting unit may accept the selecting operation by the user even while the still image fetching unit is fetching still image data into the storage unit. The prediction unit may invalidate a result of a previous prediction when a still image selected by the user has been displayed by the display unit as a result of the selecting operation accepted by the operation accepting unit, and commence a new prediction. The still image fetching unit, when the operation accepting unit accepts the selecting operation and still image data specified by the selecting operation has not been stored in the storage unit, may fetch the specified still image data in the storage unit, and, when the prediction unit invalidates the result of the previous prediction and commences the new prediction, may fetch newly predicted still image data into the storage unit.

With the above structure, the digital broadcast receiving apparatus commences a new prediction on receiving a selecting operation made by the user so that still image data to be stored in the storage unit beforehand is specified according to the current state. Therefore, even if the storage capacity for storing still image data is small, probability that a still image selected by the user will be displayed at high speed can be increased.

In the digital broadcast receiving apparatus, the still image data transmitted from the digital broadcast transmitting apparatus may be subjected to digital compression and the display unit may include: a display data storage unit for storing data to be displayed; an expansion unit for expanding still image data; and an image display unit for displaying an image according to the data stored in the display data storage unit, where the display unit expands still image data specified by the user using the expansion unit, stores the expanded still image data in the display data storage unit, and displays a still image according to the expanded still image data using the image display unit.

With the above structure, when still image data transmitted from the digital broadcast transmitting apparatus has been subjected to digital compression, the digital broadcast receiving apparatus can store compressed still image data predicted by the prediction unit as it is, prior to a display selecting operation made by the user. As a result, the storage capacity in the storage unit can be minimized.

In the digital broadcast receiving apparatus, the expansion unit may execute a computer program to expand still image data specified by the user and the still image data may be transmitted with picture data from the digital broadcast transmitting apparatus, the picture data and the still image data being to be superimposed and displayed. The digital broadcast receiving apparatus may further includes a picture receiving unit for receiving the picture data. The display unit may further include a transfer control unit for performing the first transfer for transferring the expanded still image data to the display data storage unit and the second transfer for transferring the received picture data to the displayed data storage unit by arbitrating between the first transfer and the second transfer. The transfer control unit may include: a transfer necessity detection unit for detecting whether the first transfer is necessary and detecting whether the second transfer is necessary; a transfer authorization unit for giving exclusively a transfer authorization to either of the first transfer and the second transfer; and a transfer performing unit for performing either of the first transfer and the second transfer which has been detected as being necessary and has been given the transfer authorization by the transfer authorization unit. When the transfer necessity detection unit detects that one of the first transfer and the second transfer is necessary, the transfer authorization unit gives the transfer authorization to the one of the first transfer and the second transfer; when both of the first transfer and the second transfer are detected as being necessary, the transfer authorization unit gives the transfer authorization to the first of the first transfer and the second transfer to be detected as being necessary; and when neither the first transfer nor the second transfer is detected as being necessary, the transfer authorization unit gives the transfer authorization to the first transfer.

With the above structure, the digital broadcast receiving apparatus can expand and display compressed still image data without using the AV decoder of the MPEG decoder. Therefore, even if the MPEG decoder has only one AV decoder, the MPEG decoder can expand compressed data of other pictures or audio and can superimpose and display the still image and the other pictures.

Also, the digital broadcast receiving apparatus can arbitrate between received still image data and other picture data for data transfer to the display data storage memory and gives the transfer authorization to the still image data when neither still image data nor other picture data needs to be transferred. Therefore, when still image data needs to be transferred, transfer of the still image data can be commenced without requesting the transfer authorization, so that this digital broadcast receiving apparatus is optimal for the case where still images need to be displayed at high speed even if the other pictures are deteriorated to a degree.

In the digital broadcast receiving apparatus, the image display unit may include a transfer unit for transferring still image data specified by the user from the storage unit to the expansion unit. The transfer unit includes: an input buffer for temporarily holding n pieces of inputted 8-bit data (n being an integer no less than 2); a CPU, which handles n bytes as one word, for fetching the still image data specified by the user from the storage unit and storing the fetched still image data in the input buffer n bytes at a time; a counter for counting either of from 0 to (n−1) and from (n−1) to 0; an output order storage unit for storing a value showing a counting order of the counter beforehand; a data selection unit for selecting one out of the n pieces of 8-bit data stored in the input buffer according to a value of the counter; and a data output unit for transferring the 8-bit data selected by the data selection unit to the expansion unit.

Because the digital broadcast receiving apparatus has the above structure, the CPU can fetch still image data in word units from the main memory and input the fetched still image data into the MPEG decoder even when the AV decoder of the MPEG decoder can only process 8-bit parallel data. As a result, the still image data can be transferred at high speed, in comparison with the case where the CPU transfers the still image data in byte units.

In the digital broadcast receiving apparatus, the link information may be repeatedly transmitted from the digital broadcast transmitting apparatus, and the receiving unit may receive the link information and stores the link information into the storage unit only once.

With the above structure, once the digital broadcast receiving apparatus stores the link information showing link relations among still images in the storage unit, still images which are likely to be selected by the user can be predicted by referring to the link information. Therefore, the link information does not need to be sequentially stored in the storage unit.

In the digital broadcast receiving apparatus, the link information may be composed of a plurality of pieces of link data which each are related to one piece of the still image data and show which still images are selectable by the user during a display of a still image according to the piece of still image data, the plurality of pieces of link data may be repeatedly transmitted from the digital broadcast transmitting apparatus, the receiving unit may receive the plurality of pieces of link data transmitted from the digital broadcast transmitting apparatus and sequentially stores the plurality of pieces of link data in the storage unit, and the prediction unit may predict at least one piece of still image data which is likely to be specified in a next selecting operation, by referring to one out of the plurality of pieces of link data related to data of a still image currently being displayed.

With the above structure, the link information is composed of a plurality of pieces of link data. Therefore, the digital broadcast receiving apparatus can predict still images which are likely to be selected next by the user while a still image is being displayed using at least one of the plurality of pieces of link data. As a result, the digital broadcast receiving apparatus can perform this prediction even if the storage capacity in the storage unit is small.

The above object is also achieved by a digital broadcast receiving apparatus for receiving a plurality of pieces of still image data which have been subjected to digital compression and are repeatedly transmitted from a digital broadcast transmitting apparatus and for outputting an image signal for displaying a still image selected by a user, the receiving apparatus including: a storage unit; a receiving unit for sequentially receiving the plurality of pieces of still image data; a prediction unit for predicting at least one piece of still image data which is likely to be specified by the user; a still image fetching unit for fetching, into the storage unit, every piece of still image data that has been predicted by the prediction unit out of the plurality of pieces of still image data received by the receiving unit; an operation accepting unit for accepting a selecting operation of a still image by the user, the selecting operation specifying a piece of still image data corresponding to the selected still image; and an expansion output unit for expanding the specified still image data out of the still image data in the storage unit and for outputting an image signal of the expanded still image data.

With the above structure, when a plurality of pieces of still image data is transmitted from the digital broadcast transmitting apparatus, the digital broadcast receiving apparatus receives the plurality of pieces of still image data, predicts at least one piece of still image data which is likely to be selected by the user, and stores the predicted still image data in the storage unit prior to a selecting operation made by the user, thereby increasing the probability that an image signal of a still image selected by the user will be outputted at high speed.

In the digital broadcast receiving apparatus, the receiving unit may further receive link information and store the link information in the storage unit, the link information showing which still images are selectable by the user while an image signal of each still image is being outputted, and the prediction unit may predict at least one piece of still image data which is likely to be specified by the user, by referring to the link information stored in the storage unit.

With the above structure, the digital broadcast receiving apparatus of the present invention receives information concerning which still image can be selected by the user while an image signal of a still image is being outputted, that is, link information showing link relations among still images. Still image data which should be stored in the storage unit can be predicted by referring to the link information so that, for instance, data of non-linked still images does not need to be stored in the storage unit, reducing the storage capacity in the storage unit for storing still image data.

The above object is further achieved by a digital broadcast receiving apparatus for receiving the first type data and the second type data transmitted from a digital broadcast transmitting apparatus and for outputting signals according to the first type data and the second type data, the receiving apparatus including: a signal output unit for outputting a signal according to inputted data; a receiving unit for receiving data including the first type data and the second type data; the first extracting unit for extracting the first type data out of the data received by the receiving unit; the second extracting unit for extracting the second type data out of the data received by the receiving unit; and a transfer control unit for performing the first transfer for transferring the first type data from the first extracting unit to the signal output unit and for performing the second transfer for transferring the second type data for the second extracting unit to the signal output unit by arbitrating between the first transfer and the second transfer. The transfer control unit may include: a transfer necessity detection unit for detecting whether the first transfer is necessary and detecting whether the second transfer is necessary; a priority information storage unit for storing priority information showing which of the first transfer and the second transfer has transfer priority; a transfer authorization unit for giving exclusively a transfer authorization to either of the first transfer and the second transfer; and a transfer performing unit for performing either of the first transfer and the second transfer which has been detected as being necessary and has been given the transfer authorization by the transfer authorization unit. When the transfer necessity detection unit detects that one of the first transfer and the second transfer is necessary, the transfer authorization unit gives the transfer authorization to the one of the first transfer and the second transfer; when both of the first transfer and the second transfer are detected as being necessary, the transfer authorization unit gives the transfer authorization to the first of the first transfer and the second transfer to be detected as being necessary; and when neither the first transfer nor the second transfer is detected as being necessary, the transfer authorization unit gives the transfer authorization to either of the first transfer and the second transfer by referring to the priority information.

With the above structure, the digital broadcast receiving apparatus can control data transfer according to importance of data when received data is to be expanded and outputted. Also, the transfer priority can be given to the still image data during arbitration between still image data transfer and picture data transfer, increasing the probability that a still image selected by the user will be displayed at high speed.

In the digital broadcast receiving apparatus, the first type data may be graphics data for displaying graphics, the second type data may be video data for displaying video images, the priority information stored in the priority information storage unit may show that transfer of the graphics data has the transfer priority, the transfer authorization unit may give the transfer authorization to the first transfer when the transfer necessity detection unit detects that neither the first transfer nor the second transfer is necessary, and the signal output unit may output an image signal for images where graphics and video images are superimposed according to inputted graphics data and video data.

With the above structure, the digital broadcast receiving apparatus can display graphics, such as a program table, at high speed and can display video images behind the graphics.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 7 shows the contents of the still image information table;

DESCRIPTION OF THE PREFERRED EMBODIMENTS

The following is a description of embodiments of the present invention, with reference to the drawings.
<Embodiment 1>

The following is a description of the digital broadcast receiving apparatus of Embodiment 1 of the present invention.

Figure 4:
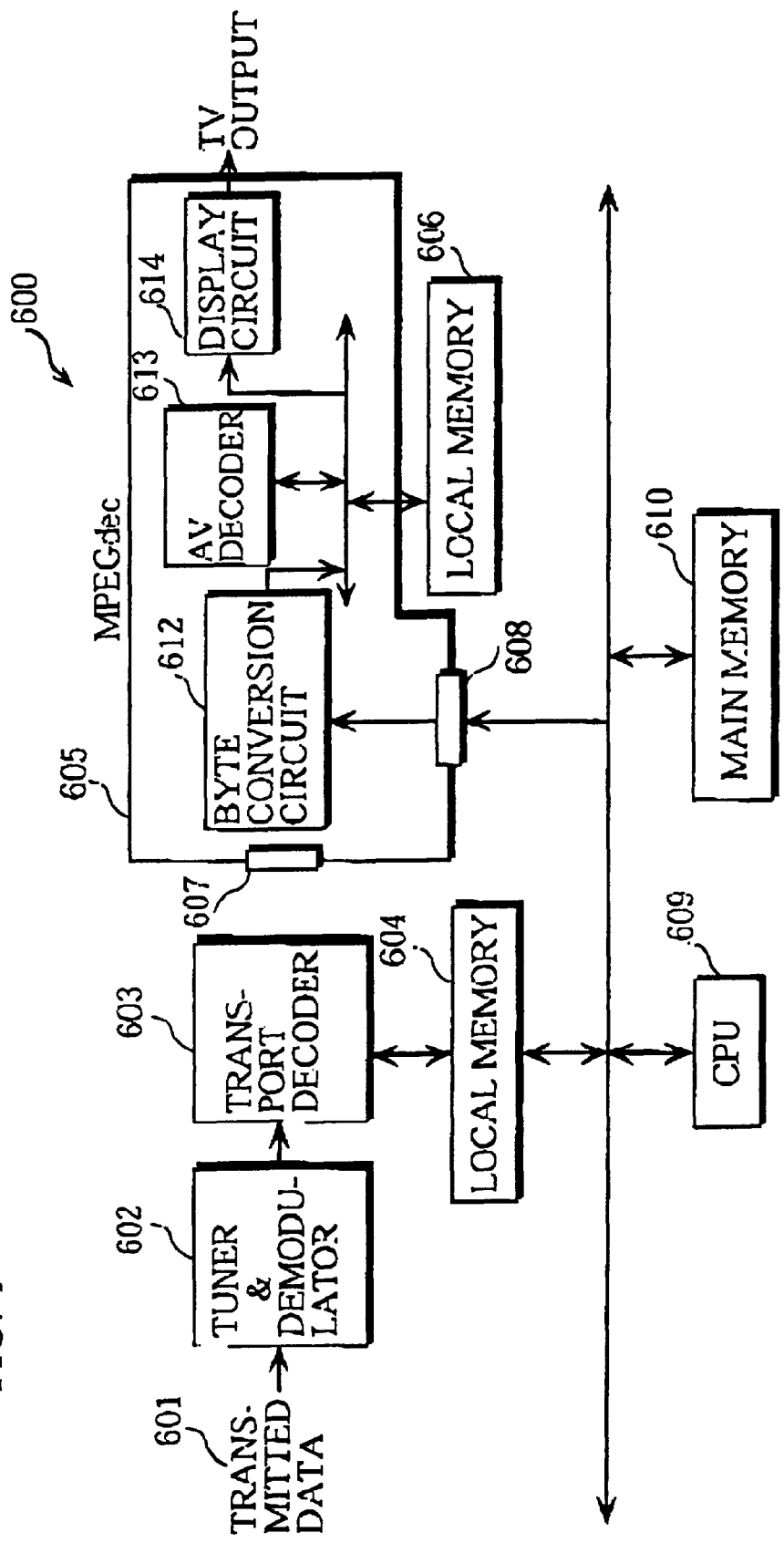
FIG. 4 is a block diagram showing the structure of the digital broadcast receiving apparatus 600 of Embodiment 1 of the present invention.

FIG. 4 is a block diagram showing the structure of the digital broadcast receiving apparatus 600 of Embodiment 1 of the present invention.

The digital broadcast receiving apparatus 600 receives data which has been subjected to digital compression and is transmitted from the digital broadcast transmitting apparatus, extracts necessary information from the received data, and displays a still image of the extracted information according to interactive operations made by a user. The digital broadcast receiving apparatus 600 includes the tuner & demodulator 602, the transport decoder 603, the local memory 604 attached to the transport decoder 603, the MPEG decoder 605, the local memory 606 attached to the MPEG decoder 605, the CPU 609 for controlling each unit of the digital broadcast receiving apparatus according to operations made by the user, and the main memory 610 accessed by the CPU 609.

The main memory 610 stores programs for achieving all functions of the digital broadcast receiving apparatus 600 under the control of the CPU 609. The main memory 610 may also store various kinds of data.

The CPU 609 detects an operation made by the user using an input unit such as a remote control in the same manner as household appliances including CPUs that control each unit according to operations made by users.

The tuner & demodulator 602 for selecting and demodulating transmitted data receives an MPEG2 transport stream indicated by the CPU 609 and outputs the received stream to the transport decoder 603.

Note that the data transmitted from the digital broadcast transmitting apparatus is MPEG2 transport streams which have been subjected to digital compression according to MPEG2 (Moving Picture Experts Group 2) standard. The MPEG2 transport streams are a plurality of transport streams, such as image and audio transport streams, which have been multiplexed using 188-byte fixed length transport packets.

The transport decoder 603 separates and extracts a specific transport stream from the received data using a packet identifier (PID) as a filter condition under the control of the CPU 609.

More specifically, the CPU 609 indicates a filter condition to the transport decoder 603 to have the transport decoder 603 extract necessary data. The CPU 609 then makes the transport decoder 603 store the necessary data in the local memory 604 and transfers the necessary data stored in the local memory 604 to the main memory 610.

The following description is based on the assumption that the data transmitted from the digital broadcast receiving apparatus is in compliance with a standard such as the ISO/IEC 13818-1 (hereinafter referred to as MPEG2 system standard) or the DVB-SI (Digital Video Broadcasting-Service Information) standard. The CPU 609 indicates the filter condition "PID-0" to the transport decoder 603 to obtain PAT (Program Association Table) of the transponder being used because the PID of the PAT is predefined as 0.

Since the PAT includes the PIDs of PMTs (Program Map Tables), the CPU 609 obtains the PID of the PMT corresponding to a program the user wants to see, has the transponder decoder 603 extract the PMT using the obtained PID as the filter condition, obtains a PID of the necessary stream data, such as "image", "audio", or "data" stream data, by referring to the extracted PMT, and separates and extracts the necessary stream data using the obtained PID as the filter condition. Note that, for case of explanation, all of the stream data can be indicated with PIDs in this description, although stream data stored using private sections of the MPEG2 standard is identified with section IDs instead of the PIDs.

When the stream type of a transport stream is "image" or "audio", the image or audio transport stream is inputted into the MPEG decoder 605. The MPEG decoder 605 expands and displays the inputted transport stream. When the stream type of a transport stream is "data", the transport decoder 603 stores the data transport stream in the local memory 604 attached to the transport decoder 603.

The MPEG decoder 605 includes the CPU access port 608 for receiving an input from the CPU 609, the byte conversion circuit 612 for converting 32-bit parallel data inputted from the CPU access port 608 into four pieces of 8-bit parallel data, the AV decoder 613 for expanding compressed still image data stored in the local memory 606 and storing the expanded still image data back into the local memory 606, and the display circuit 614 for displaying still images according to the expanded still image data stored in the local memory 606.

The following description concerns the operation of the digital broadcast receiving apparatus 600 having the structure described above.

Figure 2:
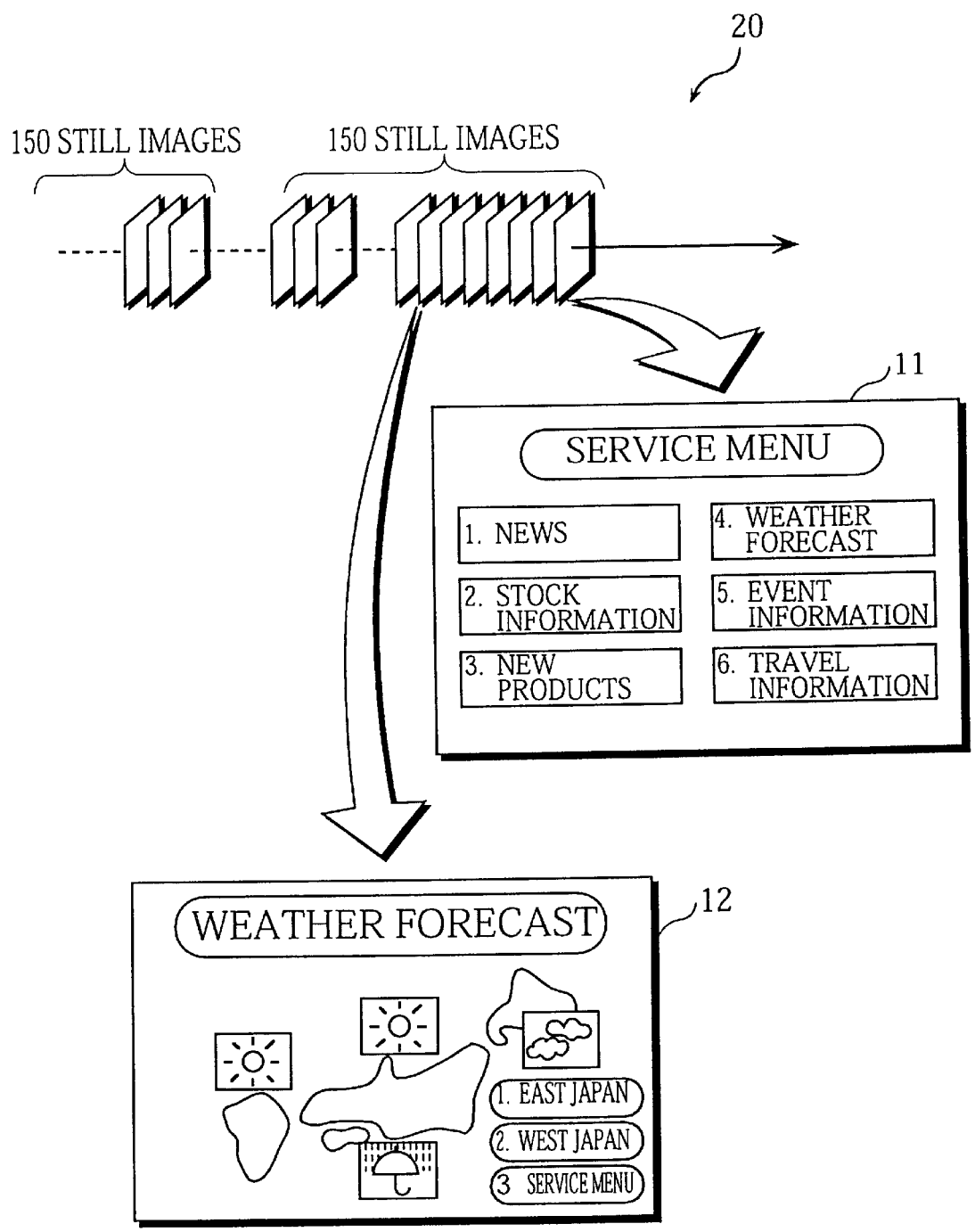
FIG. 2 shows a representation of still image data transmitted from the digital broadcast transmitting apparatus.

In this embodiment, the digital broadcast transmitting apparatus repeatedly transmits compressed data of 150 still images (see FIG. 2). Note that the digital broadcast transmitting apparatus of this embodiment transmits still image data as well as still image relation data as the "data" stream type, unlike the conventional digital broadcast transmitting apparatus described above.

The tuner & demodulator 602 of the digital broadcast receiving apparatus 600 sequentially receives the repeatedly transmitted data, demodulates the received data, and inputs the demodulated data into the transport decoder 603.

On receiving the demodulated data, the transport decoder 603 stores the still image relation data transmitted as the "data" stream type into the local memory 604 under the control of the CPU 609.

The CPU 609 transfers the still image relation data from the local memory 604 to the main memory 610, has the transport decoder 603 extract necessary still image data from received data according to operations made by the user by referring to the still image relation data, and stores the extracted still image data in the main memory 610.

The digital broadcast receiving apparatus 600 is set to display the first still image out of the transmitted plurality of still images immediately after being activated, so that the main memory 610 stores the still image relation data, the first still image data, and other necessary still image data.

The CPU 609 predicts still images which are likely to be selected by the user and has the transport decoder 603 extract data of the predicted still images. This prediction control operation of the CPU 609 will be described later.

Immediately after the digital broadcast receiving apparatus 600 is activated, the CPU 609 extracts the first still image data from the main memory 610 and inputs the first still image data into the byte conversion circuit 612 via the CPU access port 608 to display the first still image out of a plurality of still images transmitted.

The MPEG decoder 605 has the AV decoder 613 expand the first still image data inputted into the byte conversion circuit 612 using the local memory 606 and has the display circuit 614 display the expanded first still image data.

Figure 1:
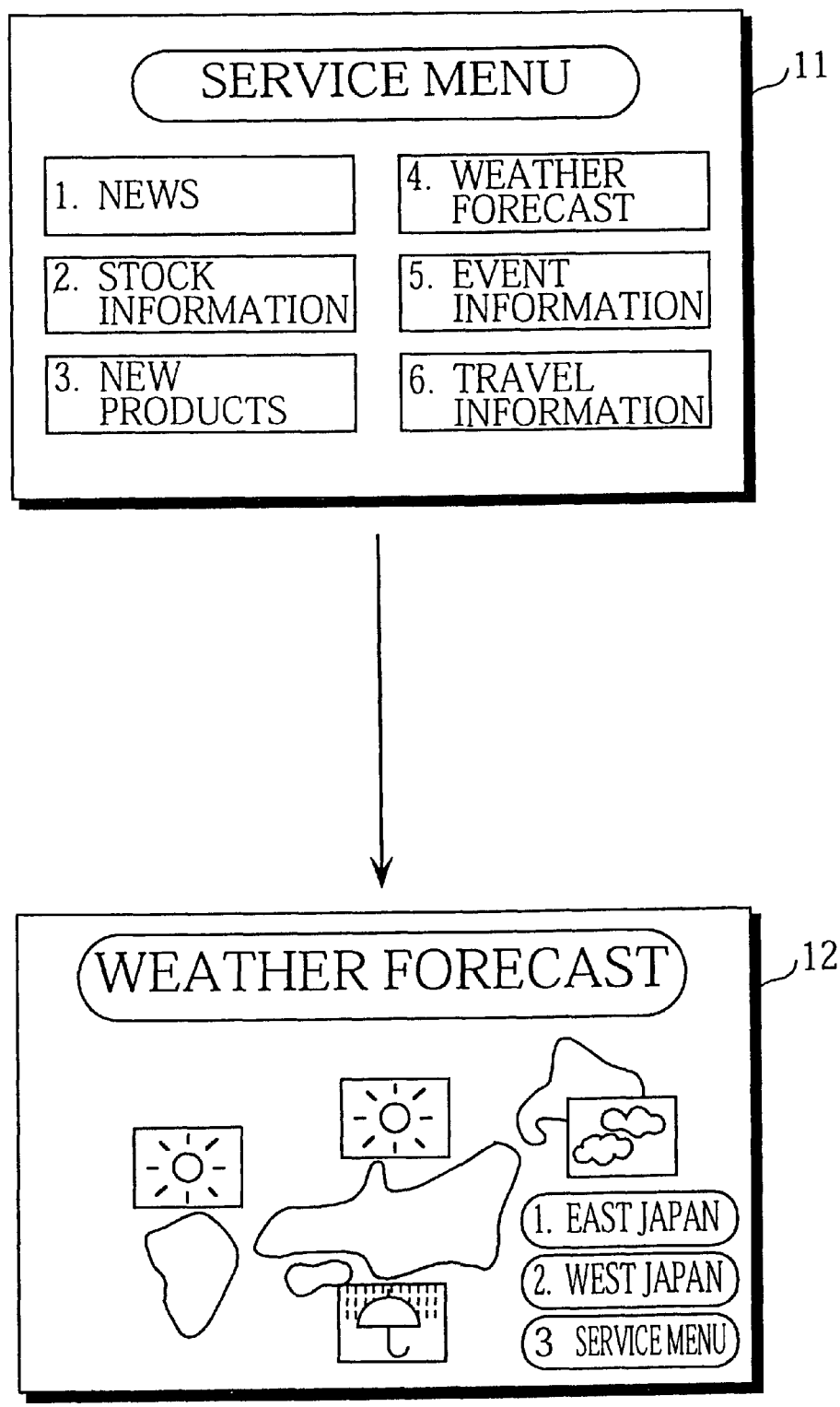
FIG. 1 shows an operation image for selecting a still image.

By doing so, the still image 11 shown in FIG. 1 is displayed by a display apparatus connected to the digital broadcast receiving apparatus 600.

When the user performs a selecting operation, such as a selecting operation of the "4. WEATHER FORECAST" item with the still image 11 being displayed, the CPU 609 receives the operation made by the user, refers to the still image relation data stored in the main memory 610, extracts data of the still image selected by the user from the main memory 610, and inputs the extracted data into the byte conversion circuit 612 in the MPEG decoder 605 via the CPU access port 608.

In the case where the still image relation data stored in the main memory 610 indicates that when the user selects the "4. WEATHER FORECAST" item in the first still image, the seventh still image is displayed, the CPU 609 inputs data of the seventh still image into the byte conversion circuit 612.

The MPEG decoder 605 stores the still image data inputted into the byte conversion circuit 612 in the local memory 606, has the AV decoder 613 expand the still image data, stores the expanded still image data back into the local memory 606, and has the display circuit 614 display the expanded still image data.

In this manner, the still image 12 shown in FIG. 1 is displayed by the display apparatus connected to the digital broadcast receiving apparatus 600.

(Byte Conversion Circuit)

The following is a detailed description of the byte conversion circuit 612 described above.

Figure 5:
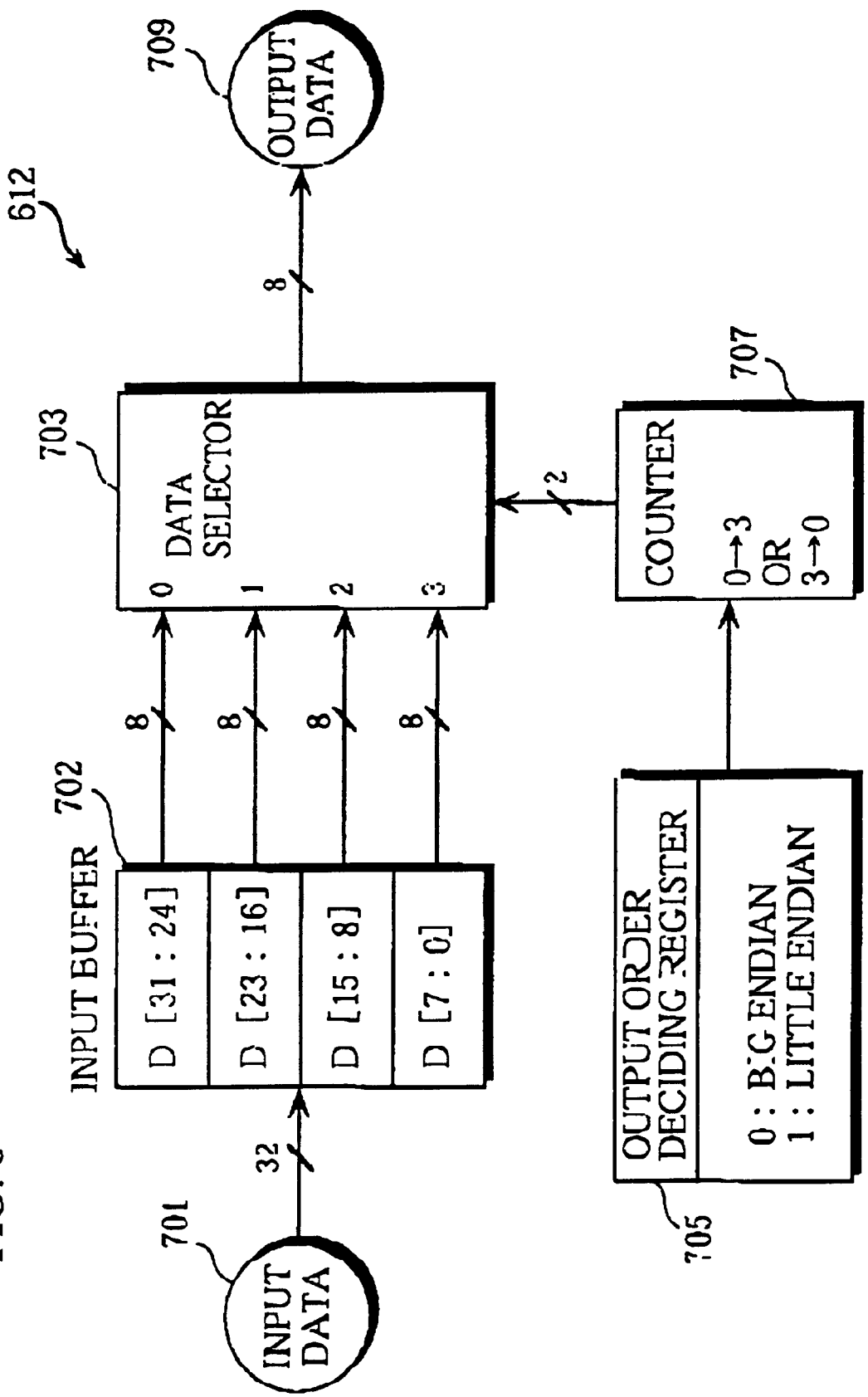
FIG. 5 is a block diagram showing the internal structure of the byte conversion circuit 612.

FIG. 5 is a block diagram showing the internal structure of the byte conversion circuit 612.

The byte conversion circuit 612 includes the 32-bit input buffer 702 for temporarily holding inputted data, the data selector 703 for selecting each piece of 8-bit data, the counter 707 for deciding which data is to be selected and for sending the selected data sequentially, and the output order deciding register 705 for deciding whether the counter 707 counts in ascending or descending order.

Note that the CPU 609 handles 4-byte data as one word and can process data at high speed when accessing the main memory 610 in 4-byte units. The CPU 609 also transmits 32-bit parallel data to the byte conversion circuit 612 via the CPU access port 608.

Also, the AV decoder 613 which fetches data outputted from the byte conversion circuit 612 can fetch 8-bit parallel data.

The input data 701, which is 32 bits wide and is inputted from the CPU 609 via the CPU access port 608, is accumulated in the input butter 702 and is inputted into the data selector 703 in 8-bit units.

Four pieces of inputted 8-bit data are outputted as the output data 709 in ascending order starting from the most significant byte or in descending order starting from the least significant byte. Whether the data is outputted starting from the most significant byte or from the least significant byte is decided by referring to the value in the output order deciding register 705.

The value in the output order deciding register 705 is set by the initial setting program, which is executed when the digital broadcast receiving apparatus 600 is activated, according to the type of the CPU. When the type of the CPU is the big endian type, the value is set to 0; when the little endian type, the value is set to 1.

When the CPU is a big endian type processor, the value in the output order deciding register 705 is set to 0 and the counter 707 counts in ascending order. Therefore, the counter 707 sequentially outputs D(31:24), D(23:16), D(15:8), and D(7:0). When the CPU is a little endian type processor, the value in the output order deciding register 705 is set to 1 and the counter 707 counts in descending order. Therefore, the counter 707 sequentially outputs D(7:0), D(15:8), D(23:16), and D(31:24).

By doing so, the byte conversion circuit 612 outputs the 4-byte data inputted by the CPU 609 one byte at a time to the local memory 606. As a result, the AV decoder 613 can sequentially fetch data from the local memory 606 by simply changing the memory address one byte at a time.

(Prediction Control Operation)

The following is a detailed description of the prediction control operation of the CPU 609 described above, that is, the procedure of the CPU 609 for storing data of a plurality of still images which are likely to be selected by the user into the main memory 110.

Figure 6:
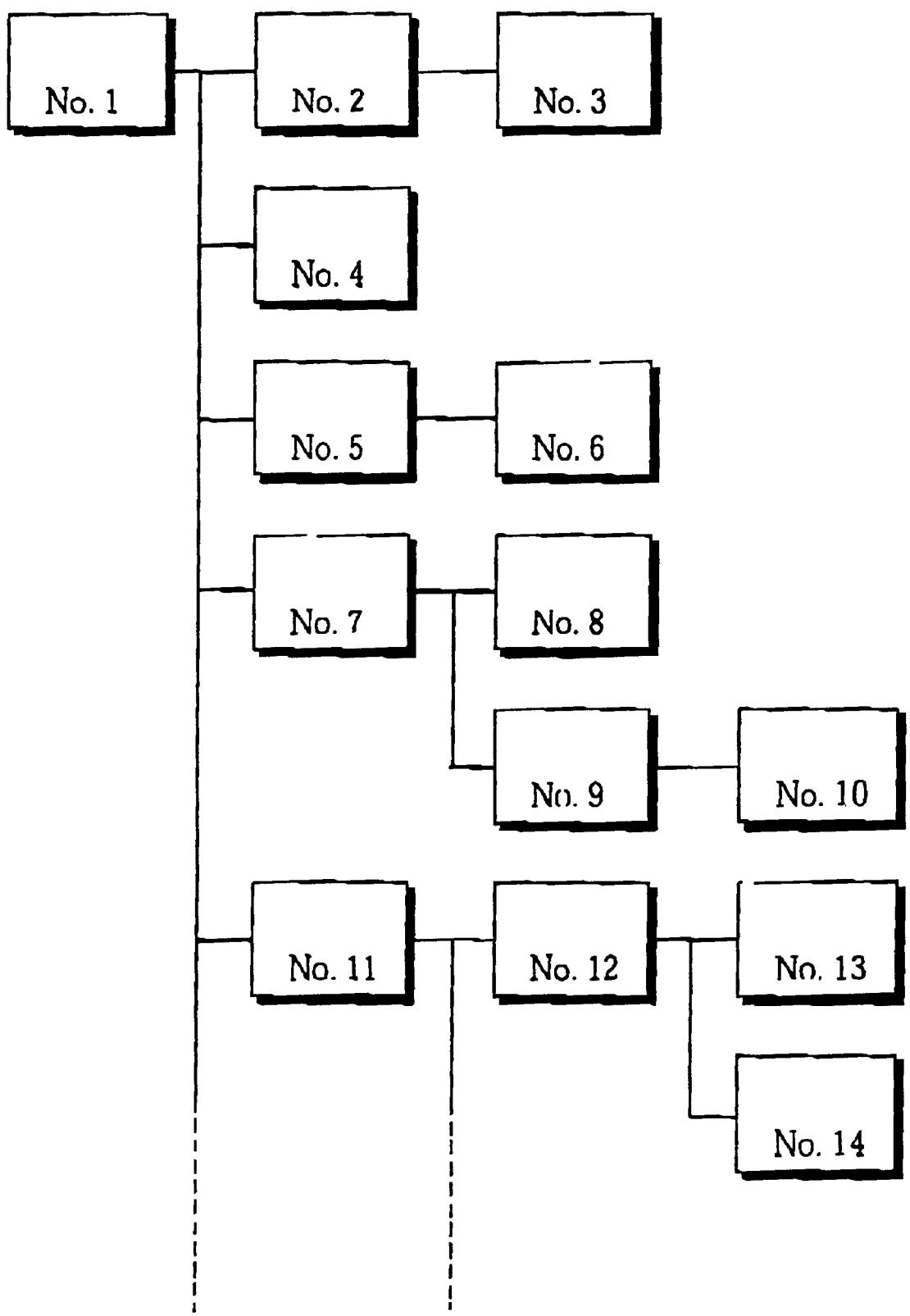
FIG. 6 shows a representation of relations among still images.

FIG. 6 shows a representation of relations among still images.

While the first still image is being displayed, the user can have the digital broadcast receiving apparatus 600 display one out of the second still image, the fourth still image, the fifth still image, the seventh still image, the eleventh still image, . . . , by selecting one.

While the seventh still image is being displayed, the user can have the digital broadcast receiving apparatus 600 display one out of the eighth still image, the ninth still image, and the first still image.

Note that the first still image is a special image wherein the user can have the digital broadcast receiving apparatus 600 display the first still image whenever any other still image is being displayed.

The still image relation data is transmitted repeatedly from the digital broadcast transmitting apparatus at a predetermined interval as the "data" stream type. The digital broadcast receiving apparatus 600 separates and extracts the still image relation data out of the received data using the transport decoder 603 under the control of the CPU 609, and stores the still image relation data in the main memory 610 via the local memory 604 only once after being activated.

The control of the CPU 609 is performed by the program stored in the main memory 610 and the CPU 609 uses the main memory 610 as the working area during the execution of the program.

The still image relation data stored in the main memory 610 is hereinafter referred to as the still image information table.

FIG. 7 shows the contents of the still image information table.

The still image information table is composed of the identification number, an identification number of the parent still image, identification numbers of the child still images, and data size, of each still image.

Here, the parent still image is a still image which was displayed prior to the present still image. The child still images are still images which can be displayed after the present still image by means of a selecting operation.

In the drawing the value (N) of the identification number indicates the Nth still image. Therefore, the parent still image of the second still image is the first still image.

Figure 8:
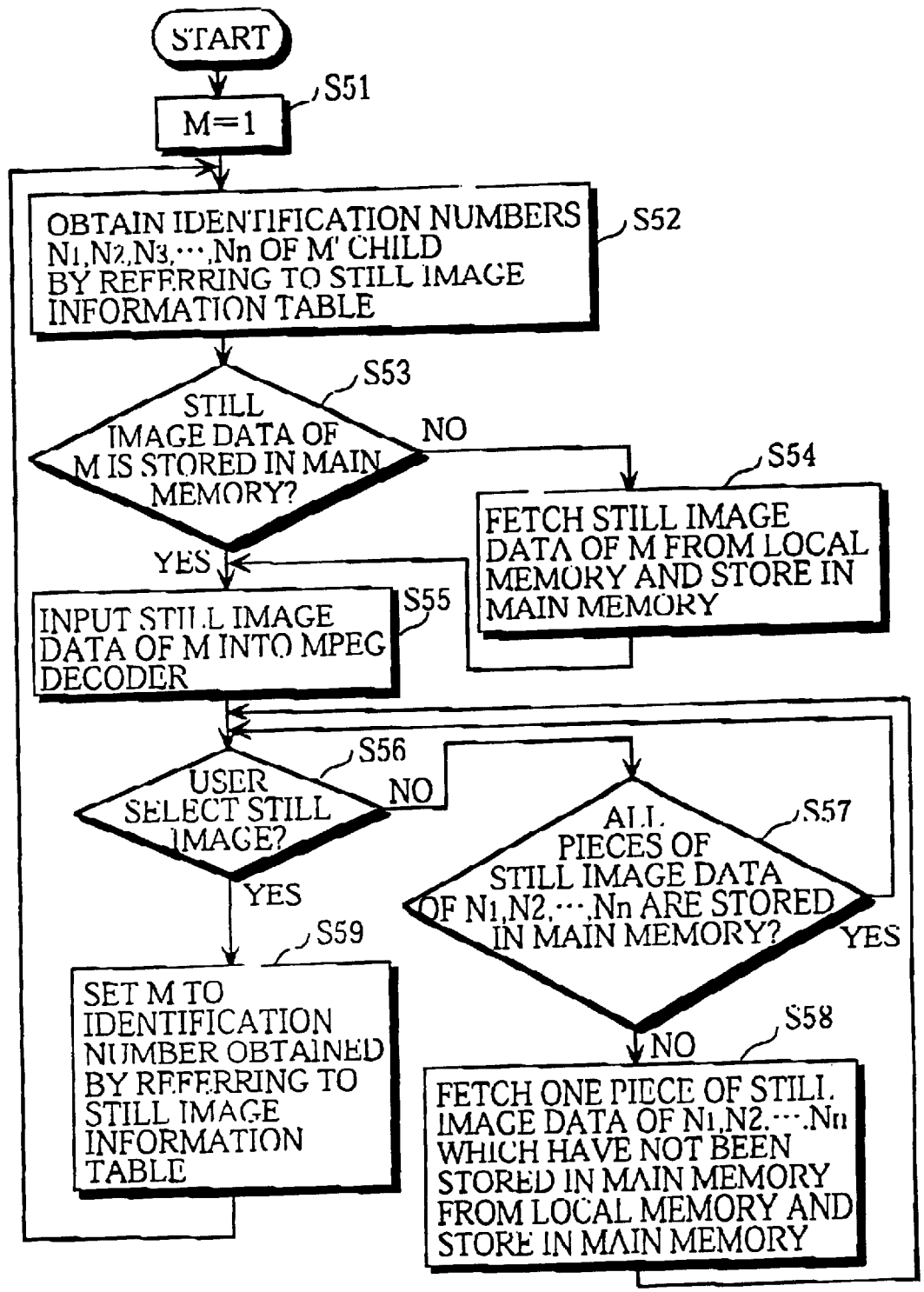
FIG. 8 is a flowchart of process for storing data of a plurality of still images which are likely to be selected by the user in the main memory 110.

FIG. 8 is a flowchart of the process for storing data of a plurality of still images which are likely to be selected by the user into the main memory 110.

The description of the process for storing still image data in the main memory 610 is provided below, with reference to process steps in the flowchart in FIG. 8.

After the digital broadcast receiving apparatus 600 is activated, the CPU 609 sets the variable M, which holds the identification number of a still image to be displayed, to the value "1" so that the first still image is displayed (step S51). Here, the identification number is a numeric value indicating the order of each still image.

The CPU 609 obtains the array variable N which holds identification numbers of child still images (step S52). In this case, the CPU 609 obtains the array variable N={2,4, 5,7,11,50} which contains the identification umbers of child still images of the first still image. This operation means that still images which are likely to be selected by the user are predicted.

The CPU 609 checks whether data of the first still image is stored in the main memory 610 (step S53). When the data is not stored, the CPU 609 controls the transport decoder 603 to extract the data out of received data and to store the extracted data in the local memory 604. The CPU 609 then fetches the data from the local memory 604, and stores the data in the main memory 610 (step S54).

The CPU 609 fetches the data for the first still image from the main memory 610 and inputs the data into the byte conversion circuit 612 of the MPEG decoder 605 via the CPU access port 608 (step S55). The MPEG decoder 605 has the AV decoder 613 expand the data inputted into the byte conversion circuit 612 using the local memory 606 and displays the expanded data using the display circuit 614.

After the digital broadcast receiving apparatus 600 displays the first still image, the CPU 609 judges whether the user has performed a selecting operation (step S56). Selecting operations may be performed by the user at any time and the CPU 609 judges whether a selecting operation has bene performed in step S56.

When the use does not perform a selecting operation, the CPU 609 refers to the array variable N={2,4,5,7,11,50} and judges whether data of every child still image, namely the second, fourth, fifth, seventh, eleventh, and fiftieth still images, is stored in the main memory 610 (step S57). When the main memory 610 does not store data for every child still image, the CPU 609 controls the transport decoder 603 to extract the data for this child still image out of received data and stores the extracted data in the local memory 604. The CPU 609 then fetches the data from the local memory 604, stores the data in the main memory 610 (step S58), and returns to the judgement in step S56.

As described above, the CPU 609 tries to store as many pieces of child still image data of a currently displayed still image as possible before the user performs the selecting operation.

When the user performs the selecting operation (step S56), the CPU 609 refers to the still image information table, obtains the identification number of the still image to be displayed, and sets the variable M to the obtained identification number (step S59). When the seventh still image should be displayed because of the selecting operation made by the user, the variable M is set to 7.

The CPU 609 returns to the process in step S52 and obtains the array variable N−{8,9} which holds the identification numbers of the child still images of the seventh still image (step S52).

After obtaining the array variable N={8,9}, the CPU 609 judges whether data of the seventh still image is stored in the main memory 610 (step S53).

When the data of the seventh still image has not been stored in the main memory 610, the CPU 609 stores the data in the main memory 610 via the transport decoder 603 in the same manner as the above process for storing the data of the first still image in the main memory 610 (step S54).

In the case where the user requests the seventh still image to be displayed after a certain time has passed after the first still image is displayed, the data of the seventh still image will already have been stored in the main memory 610 in the above step S58, so that the CPU 609 performs the operation in step S55. As a result, the seventh still image is displayed.

Afterward, the process between the steps S52 and S59 is repeated insofar as the digital broadcast receiving apparatus 600 is operated.

In this manner, the CPU 609 stores data of child still images in the main memory 610, in addition to the data of the still image presently selected by the user, to prepare for the next selecting operation by the user.

When the data of all child still images of the selected still image has not been stored in the main memory 610 before the user selects one of the child still images, the CPU 609 switches to preparation for the next selecting operation to be made by the user.

More specifically, in this situation, instead of continuing the process for storing the data of the still images having been predicted in step S52 in the main memory 610, the CPU 609 invalidates or neglects the previous prediction information and commences the process for storing data of still images newly predicted in step S52 in the main memory 610.

As described above, the CPU 609 performs the prediction control operation by predicting data of a plurality of still images which may be selected by the user and storing the predicted data in the main memory 610.

The first still image can be displayed at any time when the user selects the first still image even if any other still image is being displayed. This is because data of the first still image is not deleted after being stored in the main memory 610. However, data of other still images is deleted as necessary when there is no free space in the main memory 610 for storing data of still images which need to be stored. When deleting the data, data of still images with a low possibility of being selected in the next selecting operation by the user is deleted first.

In this manner described above, the digital broadcast receiving apparatus 600 of the present invention prepares for the next selecting operation by the user. As a result, the digital broadcast receiving apparatus 600 can realize a responsive still image information providing service even if there is a limitation on the storage area in the main memory 610 for storing data of still images.

<Embodiment 2>

Figure 3:
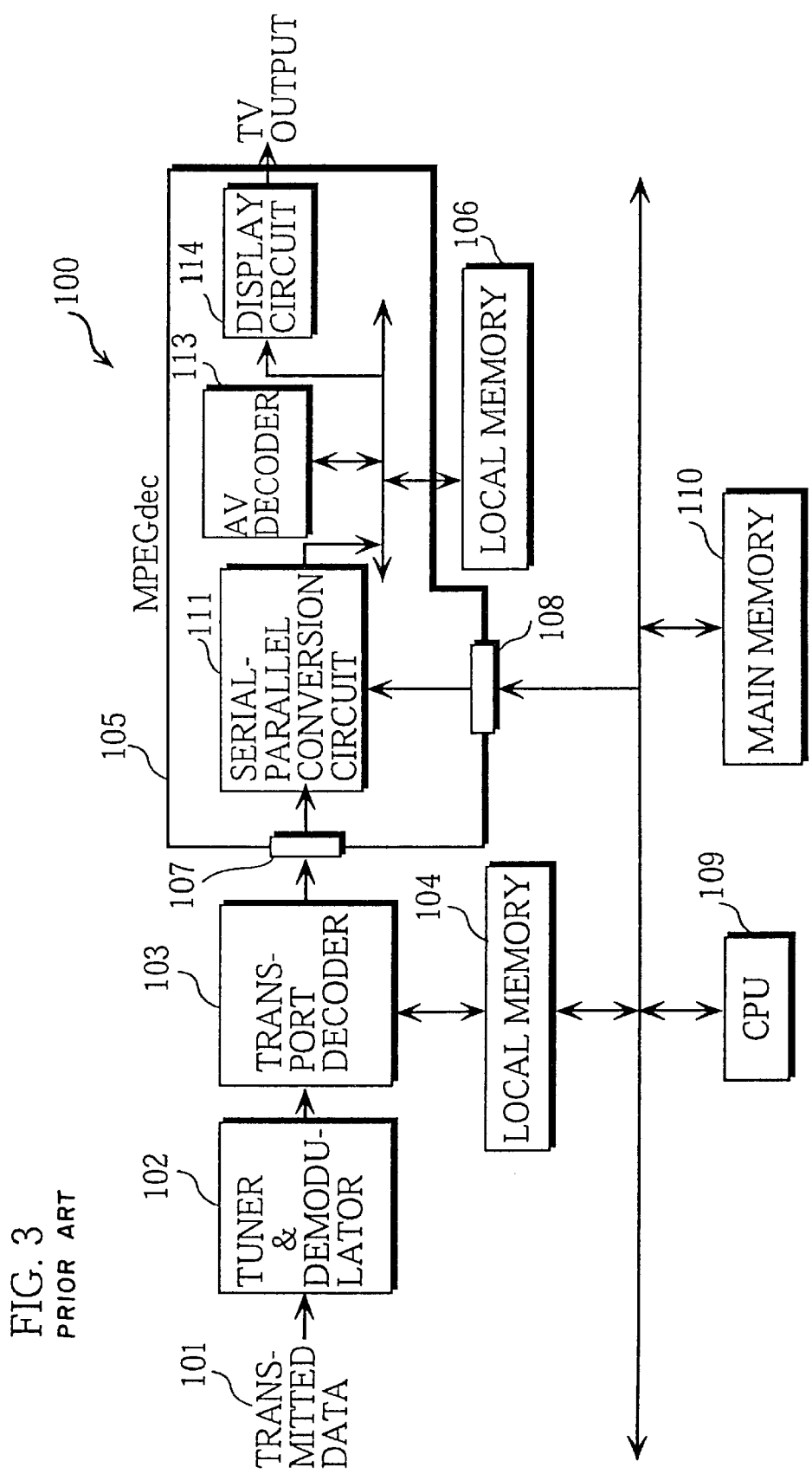
FIG. 3 is a block diagram showing the structure of the conventional digital broadcast receiving apparatus 100.

The following is a description of the digital broadcast receiving apparatus of Embodiment 2 of the present invention, with reference to FIGS. 3 and 4. The digital broadcast receiving apparatus of embodiment 2 displays still images using the graphics display function of the MPEG decoder.

The conventional MPEG decoder 105 has a function for directly outputting graphics display data stored in the local memory 106 to a TV. This function is hereinafter referred to as a graphics display function. When the CPU 109 generates data corresponding to pixels of graphics to be displayed and stores the data in the local memory 106, the MPEG decoder 105 outputs the data from the local memory 106 to the TV using the display circuit 114 (see FIG. 3).

Embodiment 2 is a modification of the digital broadcast receiving apparatus 600 of Embodiment 1 and differs in the process for displaying still image data stored in the main memory 610.

More specifically, in Embodiment 2, the digital broadcast receiving apparatus 600 stores a program for expanding compressed still image data in the main memory 610 (see FIG. 4). In Embodiment 1, still image data stored in the main memory 610 is expanded by the AV decoder 613 of the MPEG decoder 605 and is displayed. However, in Embodiment 2, the still image data stored in the main memory 610 is expanded by a program which is stored in the main memory 610 and is executed by the CPU 609. The expanded data is then converted into pixel data which can be displayed, is stored in the local memory 606, and is displayed by the graphics display function of the MPEG decoder 605 (see FIG. 4).

The digital broadcast receiving apparatus of Embodiment 2 is the same as that of Embodiment 1 except for the above operation and therefore is not described here. Note that the technique for expanding compressed still image data using software is a conventional technique.

<Embodiment 3>

Figure 9:
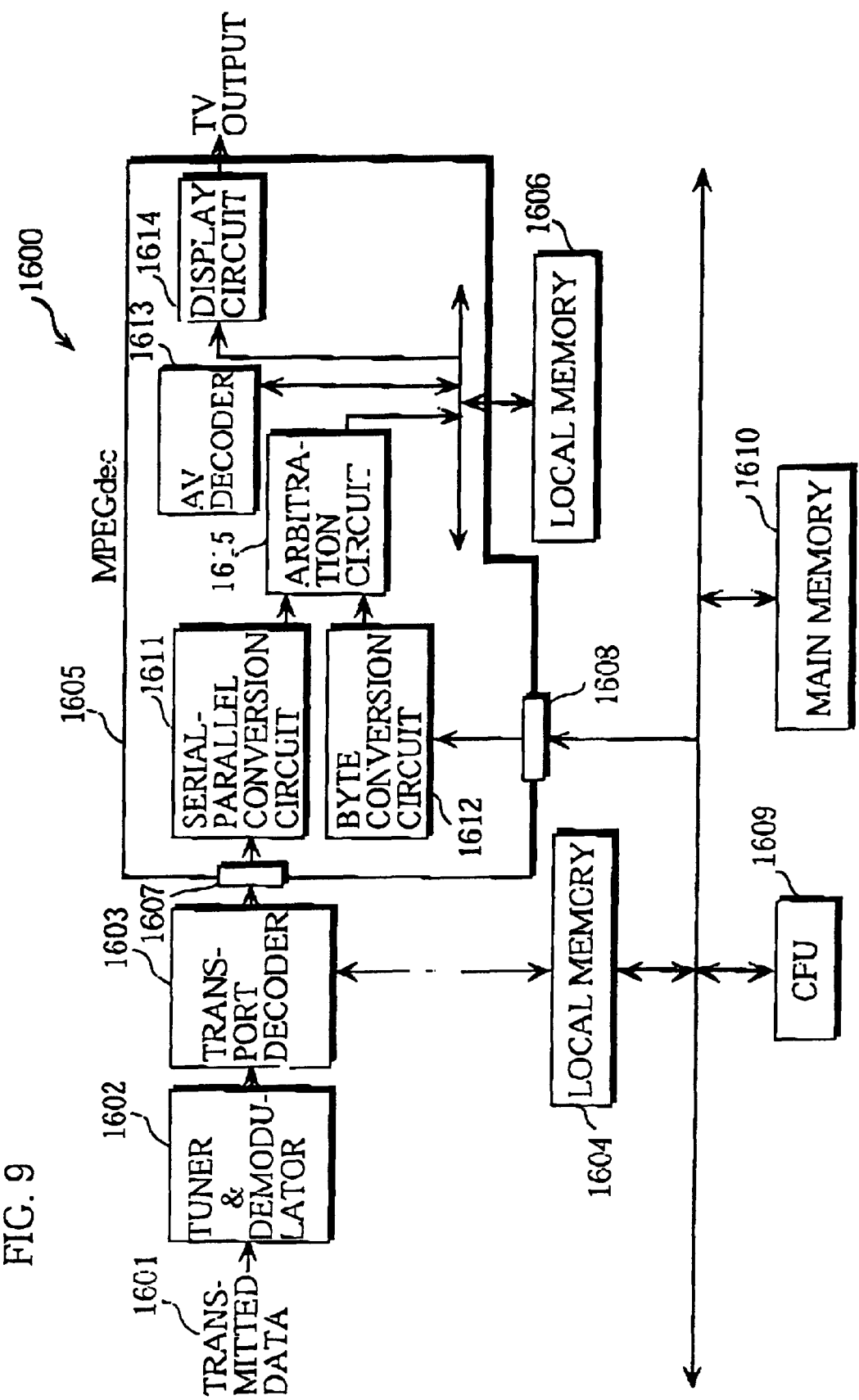
FIG. 9 is a block diagram showing the structure of the digital broadcast receiving apparatus 1600 of Embodiment 3.

The following description concerns the digital broadcast receiving apparatus of Embodiment 3 of the present invention, with reference to FIGS. 3 and 9.

The digital broadcast receiving apparatus of Embodiment 3 uses the graphics display function of the MPEG decoder, but also uses the function of the MPEG decoder for expanding and displaying picture data, so that a still image is displayed with other superimposed pictures.

The MPEG decoder 105 conventionally has a function for displaying graphics of pixel data stored in the local memory 106 and a function for expanding and displaying compressed picture and audio data stored in the local memory 106 using the AV decoder 113 (see FIG. 3).

Both of the pixel image data generated by the CPU according to graphics display data and pixel image data of still images obtained by expanding compressed still image data with the program executed by the CPU are hereinafter referred to as graphics data.

FIG. 9 is a block diagram showing the structure of the digital broadcast receiving apparatus 1600 of Embodiment 3.

The digital broadcast receiving apparatus 1600 includes the tuner & demodulator 1602 for selecting and demodulating transmitted data, the transport decoder 1603 for separating "image" packets, "audio" packets, and "data" packets from transport streams, the local memory 1604 attached to the transport decoder 1603, the MPEG decoder 1605, the local memory 1606 attached to the MPEG decoder 1605, the CPU 1609 for controlling each unit of the digital broadcast receiving apparatus, and the main memory 1610 accessed by the CPU 1609.

The main memory 1610 stores programs for achieving all functions of the digital broadcast receiving apparatus 1600 under the control of the CPU 1609. Furthermore, the main memory 1610 may store other kinds of data.

The data 1601 transmitted from a transmitting apparatus is selected and demodulated by the tuner & demodulator 1602 and is inputted into the transport decoder 1603. The data transmitted from the transmitting apparatus in this embodiment is transport streams which are a plurality of code streams that have been subjected to the time-division multiplexing in packets of relatively short fixed length.

The transport decoder 1603 separates and extracts a specific transport stream from received data using a packet identifier (PID) as a filter condition under the control of the CPU 1609.

More specifically, the CPU 1609 indicates a filter condition to the transport decoder 1603 to have the transport decoder 1603 extract necessary data. The CPU 1609 stores the extracted data in the local memory 1604 and transfers the necessary data stored in the local memory 1604 to the main memory 1610.

The following description is based on the assumption that the data transmitted from the digital broadcast receiving apparatus is in compliance with a standard such as the MPEG2 system standard or the DVB-SI standard. The CPU 1609 obtains the PAT of a predefined PID by indicating a filter condition to the transport decoder 1603, obtains the PID of the PMT by referring to the PAT, extracts the PMT by indicating the obtained PID as the filter condition, obtains the PID of necessary stream data of "image", "audio", or "data" stream type by referring to the PMT, and separates and extracts the necessary stream data using the obtained PID as the filter condition.

When the stream type of transport streams is "image" or "audio", the transport decoder 1603 inputs the image or audio transport streams into the MPEG decoder 1605, and the MPEG decoder 1605 expands and displays the inputted transport streams. When the stream type of transport streams is "data", the transport decoder 1603 stores the data transport streams in the local memory 1604 attached to the transport decoder 1603.

Data stored in the local memory 1604 can be accessed by the CPU 1609.

The digital broadcast transmitting apparatus of Embodiment 3 transmits video and audio data of a TV program, graphics display data of a program table, and data of 150 still images.

The data of the 150 still images is repeatedly transmitted. The video data is transmitted as the "image" stream type, the audio data as the "audio" stream type, and the graphics display data and the still image data is the "data" stream type.

The tuner & demodulator 1602 of the digital broadcast receiving apparatus 1600 sequentially receives the repeatedly transmitted data, demodulates the received data, and inputs the demodulated data in the transport decoder 1603.

On receiving the data, the transport decoder 1603 stores still image relation data transmitted as the "data" stream type in the local memory 1604 under the control of the CPU 1609.

The CPU 1609 transfers the still image relation data from the local memory 1604 to the main memory 1610, has the transport decoder 1603 extract necessary still image data from the received data according to operations made by the user by referring to the still image relation data, and stores the extracted still image data in the main memory 1610.

The digital broadcast receiving apparatus 1600 is set to display the first out of the transmitted plurality of still images immediately after being activated, so that the main memory 1610 stores the still image relation data, data of the first still image, and data of other necessary still images.

The CPU 1609 predicts still images which are likely to be selected by the user and has the transport decoder 1603 extract data of the predicted still images. This prediction control operation of the CPU 1609 is the same as that of the CPU 609 in the first embodiment.

The MPEG decoder 1605 includes the AV decoder 1613 for expanding compressed picture and audio data stored in the local memory 1606 and storing the expanded data back into the local memory 1606, the display circuit 1614 for displaying the expanded picture and audio data and for directly displaying graphics display data stored in the local memory 1606 where the picture data and the graphics display data are superimposed, the stream input port 1607 for receiving an input of compressed picture and audio data from the transport decoder, the serial-parallel conversion circuit 1611 for converting serial data inputted from the stream input port 1607 into 8-bit parallel data, the CPU access port 1608 for receiving graphics data from the CPU 1609, the byte conversion circuit 1612 for converting 32-bit data inputted from the CPU access port into four pieces of 8-bit data, and the arbitration circuit 1615 for transferring to the local memory 1606 picture and audio data transmitted from the serial-parallel conversion circuit 1611 and graphics data transmitted from the byte conversion circuit 1612.

Because the digital broadcast receiving apparatus 1600 is set to display the first still image out of the transmitted plurality of still images immediately after being activated, the CPU 1609 fetches data of the first still image from the main memory 1610, expands the fetched data under the control of a program stored in the main memory 1610 to generate graphics data to be displayed, and inputs the generated graphics data into the arbitration circuit 1615 via the CPU access port 1608 and the byte conversion circuit 1612.

Picture and audio data transmitted from the digital broadcast receiving apparatus is extracted by the transport decoder 1603 under the control of the CPU 1609 and is inputted into the arbitration circuit 1615 via the stream input port 1607 and the serial-parallel conversion circuit 1611.

The arbitration circuit 1615 stores the graphics data and the compressed picture and audio data that it receives through different paths into the local memory 1606.

The compressed picture and audio data stored in the local memory 1606 is expanded by the AV decoder 1613 and is stored back into the local memory 1606.

The display circuit 1614 superimposes and displays the expanded picture data and the graphics data of still images stored in the local memory 1606.

When the user selects the seventh still image, the digital broadcast receiving apparatus 1600 superimposes and displays graphics data of the seventh still image and other pictures, in the same way as when displaying the first still image.

As described above, the digital broadcast receiving apparatus of the present invention can superimpose and display a still image and other pictures.

<Embodiment 4>

The following is a description of the digital broadcast receiving apparatus of embodiment 4 of the present invention.

In Embodiment 3, the digital broadcast receiving apparatus displays still images using the graphics display function of the MPEG decoder.

This graphics display function of the MPEG decoder is also used to display graphics display data, such as a program table, transmitted from the digital broadcast transmitting apparatus. This graphics display data includes figure type data, display coordinate data, and size data for displaying characters and figures such as lines. The CPU 1609 stores the graphics display data in the main memory 1610 via the transport decoder 1603 and the local memory 1604, and generates graphics data which represents pixel images from the graphics display data.

Embodiment 4 will be described using an example where the digital broadcast receiving apparatus of the present invention receives graphics display data for a program table and picture and audio data, and superimposes and displays graphics and the picture data. Other aspects are the same as in Embodiment 3. In particular, the arbitration circuit 1615, which was not described fully in Embodiment 3, is described in detail in comparison with an arbitration circuit configured according to conventional thought (hereinafter referred to as a conceivable arbitration circuit).

The display circuit displays the picture data expanded by the AV decoder 1613, superimposing the picture data with graphics data generated by the CPU 1609, by outputting a signal for TV output (see FIG. 9).

Figure 10:
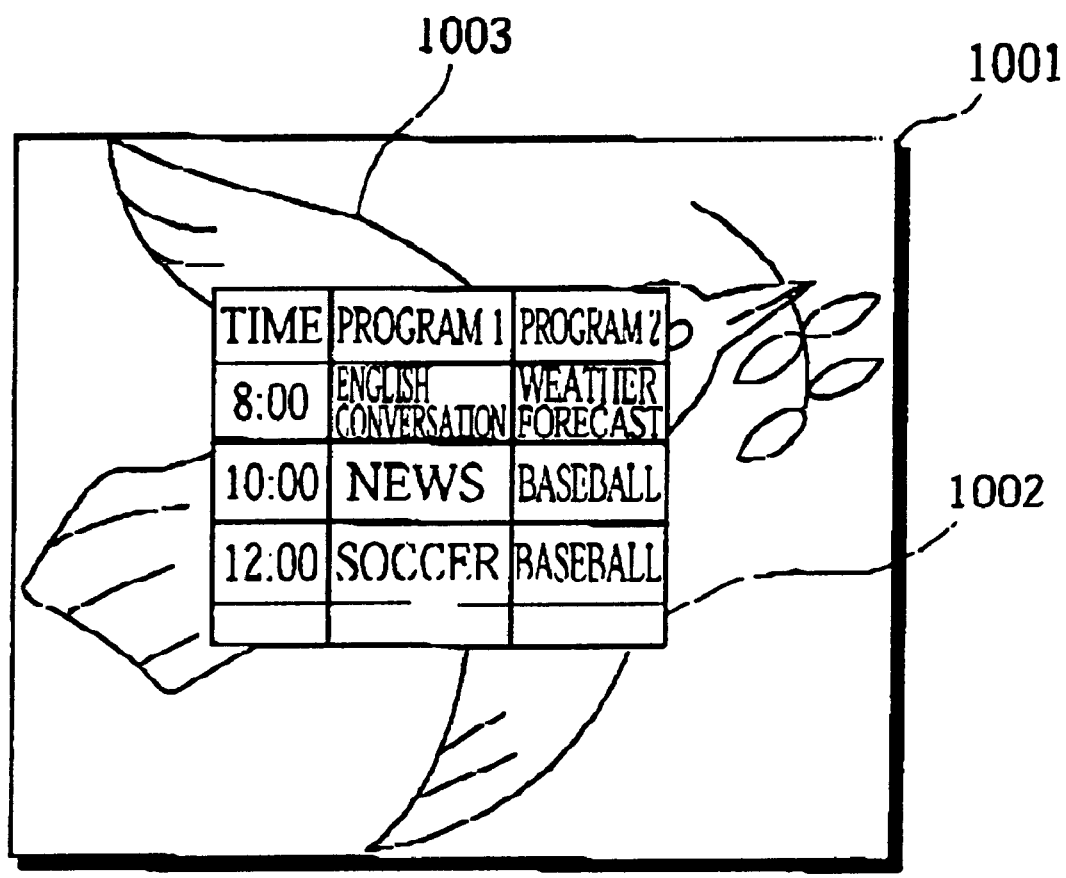
FIG. 10 shows a display screen in which a picture and graphics are superimposed and displayed.

FIG. 10 shows a display screen in which a picture and graphics are superimposed and displayed.

The display screen 1001 displays the graphics 1002 with the video images 1003 in the background. Although not shown in the figure, audio is also replayed while the graphics 1002 and the video images 1003 are being displayed.

To superimpose and display a picture and graphics and to replay audio, picture and audio data and graphics data are transferred through different paths and stored in the local memory 1606.

The arbitration circuit 1615 arbitrates data transferred through the different paths and controls data transfer for storing data in the local memory 160*b* via a bus.

(Conceivable Arbitration Circuit)

The following is a description of the conceivable arbitration circuit, with reference to FIGS. 11–14.

Figure 11:
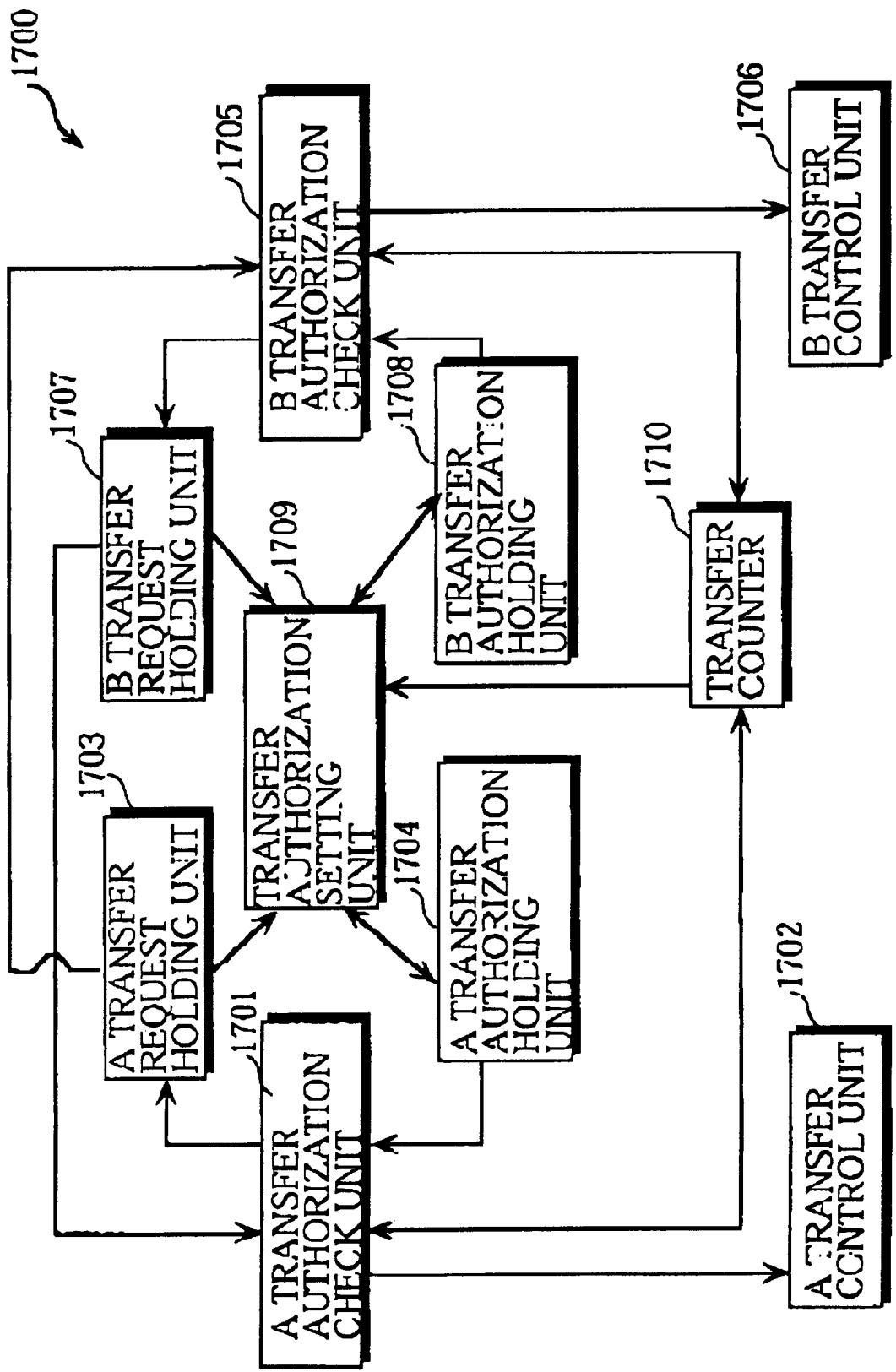
FIG. 11 is a functional block diagram of the conceivable arbitration circuit 1700.

FIG. 11 is a functional block diagram of the conceivable arbitration circuit 1700.

Picture and audio data is transmitted intermittently to the arbitration circuit 1700 at a predetermined transmission rate. Graphics data is also transmitted intermittently to the arbitration circuit 1700.

The following description is based on the assumption that picture and audio data is called "A", transfer of picture and audio data to the local memory of the MPEG decoder "A transfer", graphics data "B", and transfer of graphics data to the local memory of the MPEG decoder "B transfer".

The arbitration circuit 1700 includes: the transfer counter 1710 for counting the number of transfer clock cycles during the A or B transfer; the A transfer control unit 1702 for controlling the a transfer; the B transfer control unit 1706 for controlling the B transfer; the A transfer authorization check unit 1701 for checking whether A transfer is possible and, if so, instructing the A transfer control unit 1702 to perform the A transfer; the B transfer authorization check unit 1705 for checking whether B transfer is possible and, if so, instructing the B transfer control unit 1706 to perform the B transfer; the A transfer authorization holding unit 1704 for holding an A transfer authorization; the B transfer authorization holding unit 1708 for holding a B transfer authorization; the transfer authorization setting unit 1709 for setting a value indicating the transfer authorization in one of the A transfer authorization holding unit 1704 and the B transfer authorization holding unit 1708 and setting a value indicating no transfer authorization in the other of the A and B transfer authorization holding units; the A transfer request holding unit 1703 for holding a transfer authorization request from the A transfer authorization check unit 1701; and the B transfer request holding unit 1707 for holding a transfer authorization request from the B transfer authorization check unit 1705.

The value of the transfer counter 1710 is set to a value obtained by subtracting 1 from the number of clock cycles in one processing unit when the a transfer control unit 1702 or the B transfer control unit 1706 starts transfer. The value is decremented by one in each clock cycle. If one processing unit for the A transfer and the B transfer is set at 2 clock cycles, the transfer counter is set to 1 when transfer is commenced.

Here, picture and audio data needs to be transferred at a predetermined transfer rate so that the A transfer cannot wait until the B transfer is completed. Therefore, the A transfer and the B transfer are each divided into certain processing units and are processed in the processing units. When the A and B transfer requests are issued at the same time, the A and B transfers are alternatively processed for a given processing amount.

Figure 12:
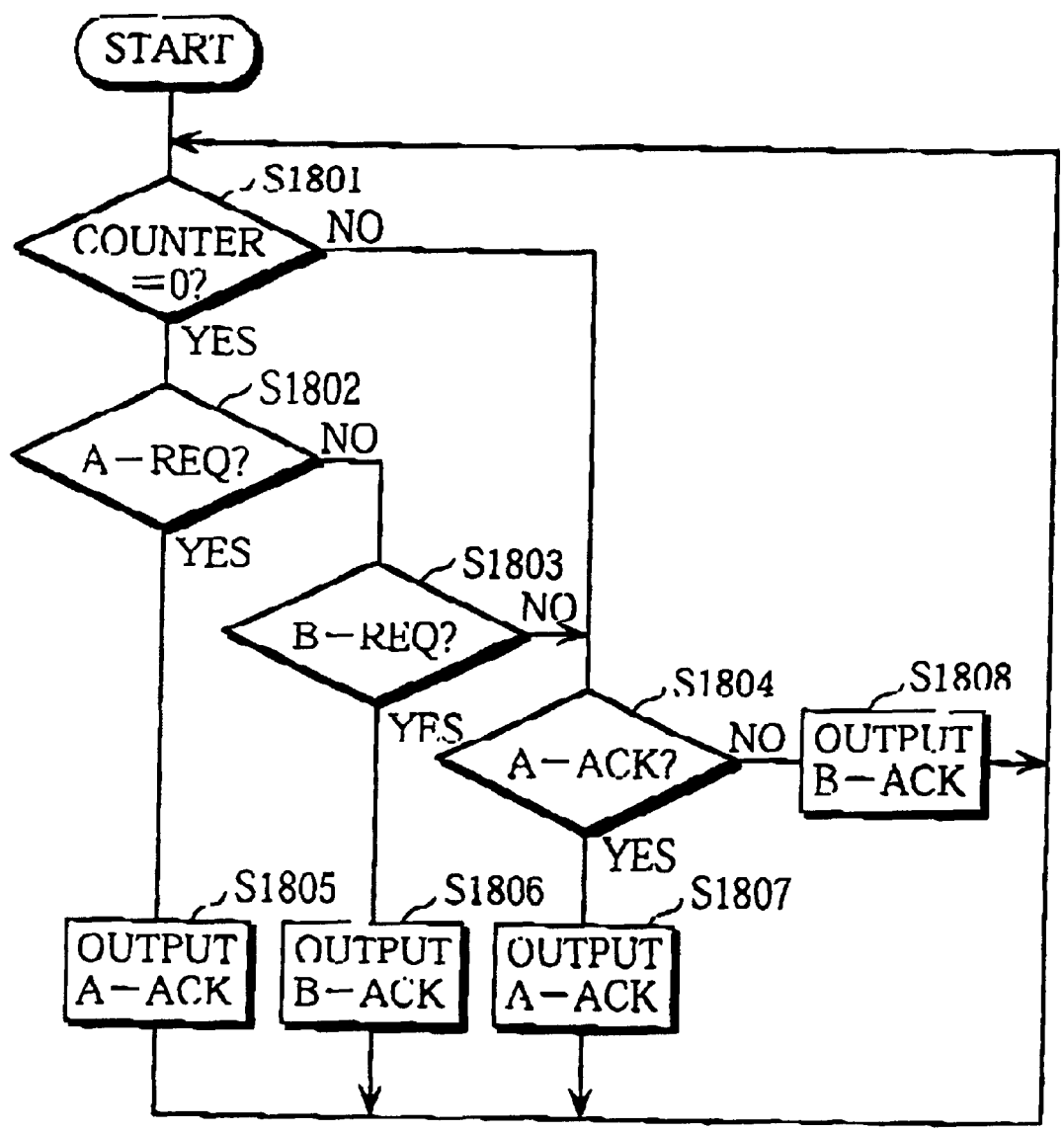
FIG. 12 is a flowchart showing the process flow of the transfer authorization setting unit 1209 of the conceivable arbitration circuit 1700.

FIG. 12 is a flowchart showing the process flow of the transfer authorization setting unit 1709 of the arbitration unit 1700.

The flow loops once in one clock cycle.

In the flow, the A-REQ is a signal indicating that an A transfer request has been issued, the B-REQ is a signal indicating that a B transfer request has been issued, the A-ACK is a signal indicating an A transfer authorization, and the B-ACK is a signal indicating a B transfer authorization.

When the transfer counter 1710 is 0 and an A transfer request has been issued to the A transfer request holding unit 1703, a value indicating the transfer authorization is set in the A transfer authorization holding unit 1704 (steps S1801, S1802, and S1805).

When the transfer counter 1710 is 0, an A transfer request has not been issued to the A transfer request holding unit 1703, and a B transfer request has been issued to the B transfer request holding unit 1707, a value indicating the transfer authorization is set in the B transfer authorization holding unit 1708 (steps S1801, S1802, S1803, and S1806).

At all other times, values of the A and B transfer authorization holding units 1704 and 1708 are maintained (steps S1801, S1804, S1807, and S1808).

Figure 13:
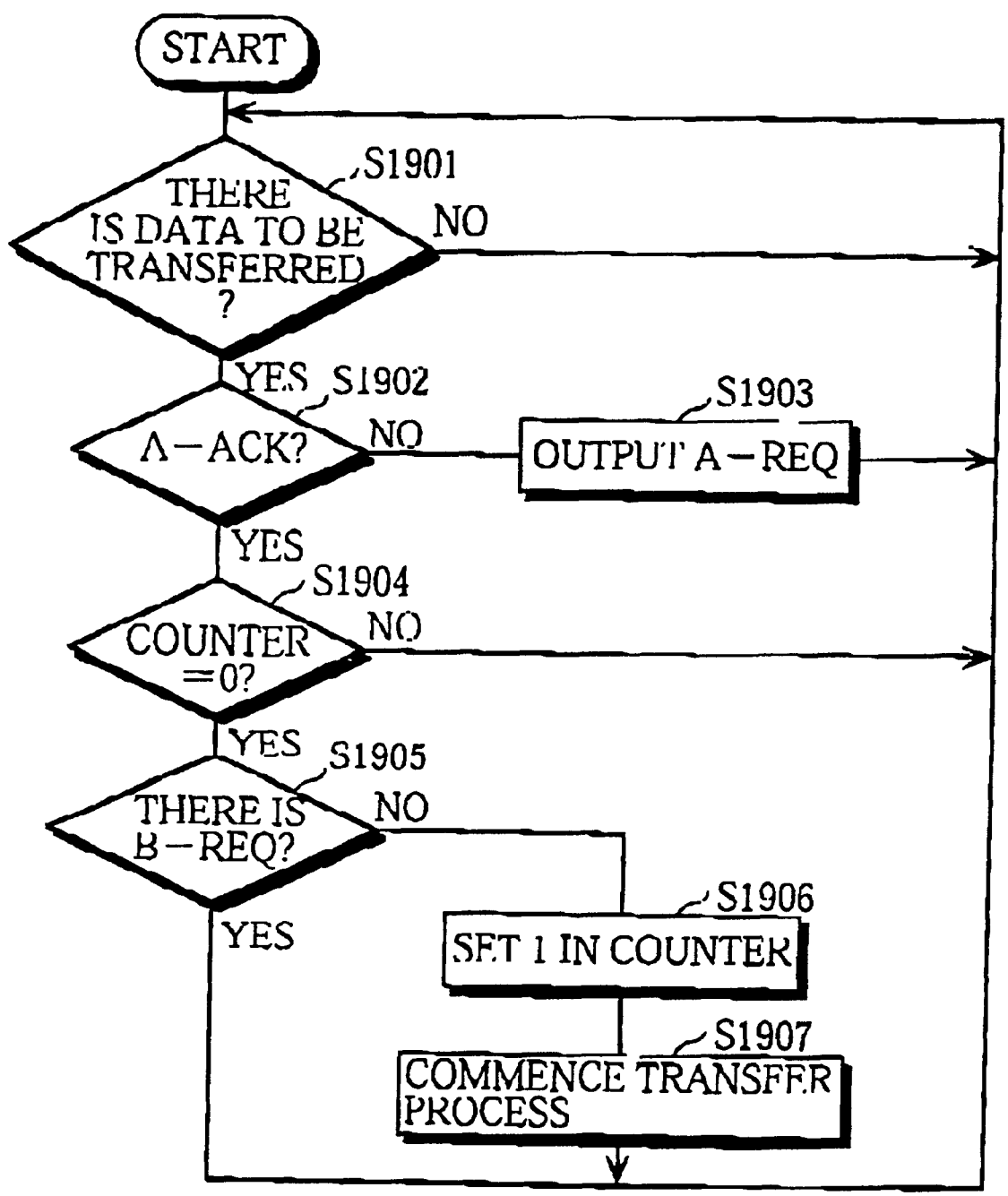
FIG. 13 is a flowchart showing the process flow of the A transfer authorization check unit 1701.

FIG. 13 is a flowchart showing the process flow of the A transfer authorization check unit 1701 of the arbitration circuit 1700.

This flow also loops once in one clock cycle.

When there is data to be transferred and there is no value indicating the transfer authorization in the A transfer authorization holding unit 1704, a value of a transfer request is set in the A transfer request holding unit 1703 (steps S1901, S1902, and S1903).

When there is data to be transferred, there is a value indicating the transfer authorization in the A transfer authorization holding unit 1704, the transfer counter 1710 is 0, and there is no value indicating a transfer request in the B transfer request holding unit 1707, the value 1 obtained by subtracting 1 from the number of 2 clock cycles in one processing unit is set in the transfer counter 1710 to commence an A transfer under the control of the A transfer control unit 1702 (steps S1901, S1902, S1904, S1905, S1906, and S1907).

Note that the process flow of the B transfer authorization check unit 1705 is the flow in FIG. 13 wit A and B interchanged, so that this is not described here.

The following is a description of the process timing of the A transfer and the B transfer with the arbitration circuit 1700 having the above structure and process flow.

Figure 14:
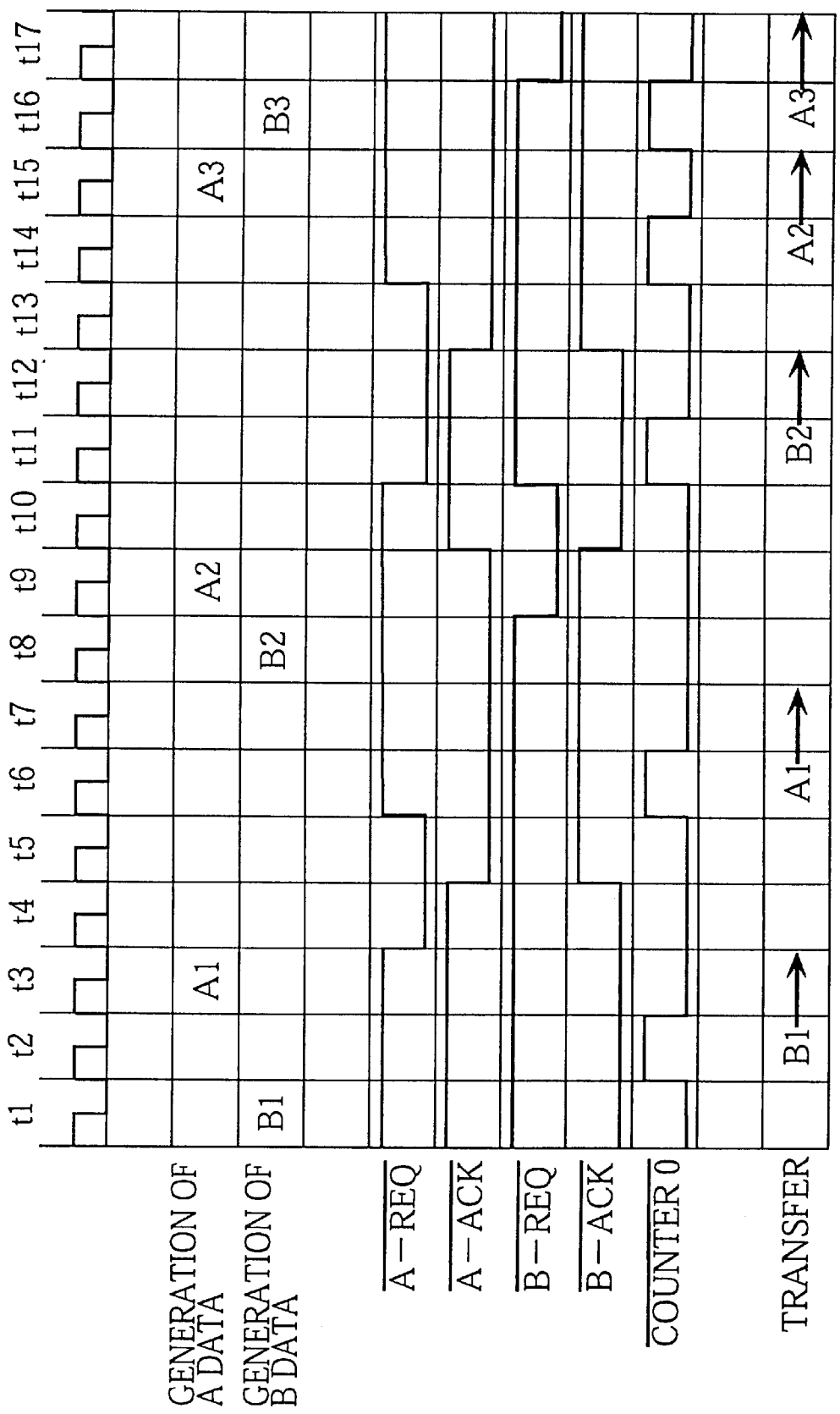
FIG. 14 shows timing of process by the conceivable arbitration circuit 1700.

FIG. 14 shows the process timing of the arbitration circuit 1700.

A transfer requests are intermittently issued without regard to the time taken by the A transfer. When the A transfer is performed slowly, that is, when there is a long time lag between the transfer request issuance and the transfer completion due to the arbitration circuit making the transfer request wait, there are cases where the data requested by the A transfer is abandoned. However, even if some picture data is abandoned, this will only result in a slight reduction in the quality of the displayed images.

Graphics data, meanwhile, is generated by the CPU 1609 and so is not sent from the outside so that, immediately after B transfer is completed, the CPU 1609 can request next B transfer. As a result, when B transfer is performed at high speed, the next B transfer request is issued immediately; when B transfer is performed slowly, the next B transfer request is issued after a long time. Also, the data for B is not abandoned.

In t1, B1 is generated and B has already obtained the transfer authorization (B-ACK), so that B1 is transferred in 2 clock cycles of t2 and t3.

In t3, A1 is generated and A does not have the transfer authorization (A-ACK), so that a transfer request (A-REQ) is issued in t4.

In t4, the counter is 0, so that A is given the transfer authorization (A-ACK) corresponding to the issued transfer request (A-REQ) in t5.

In t5, A has already obtained the transfer authorization (A-ACK), so that A1 is transferred in 2 clock cycles of t6 and t7.

In T8 when 5 clock cycles have passed after B1 was transferred (t3), B2 is generated and B does not have the transfer authorization (B-ACK), so that a transfer request (B-REQ) is issued in t9.

In t9, the counter is 0, so that B is given the transfer authorization (B-ACK) corresponding to the issued transfer request (B-REQ) in t10.

In t10, B has already obtained the transfer authorization (B ACK), so that B2 is transferred in 2 clock cycles of t11 and t12.

In the same way, A2 generated in t9 is transferred in 2 clock cycles of t14 and t15, and A3 is transferred in 2 clock cycles of t16 and t17.

In t16 when 4 clock cycles have passed after the transfer of B2 is completed, B3 is generated. However, B3 is not transferred by t17.

As described above, after A transfer is performed, A maintains the transfer authorization with the arbitration circuit 1700. Therefore, when B transfer needs to be performed at this state, the B transfer can be performed only after a B transfer request is issued and B obtains the transfer authorization after at least one clock cycle has passed.

More specifically, with the conceivable arbitration circuit, after transfer of one of A and B in one processing unit ha been performed, the same transfer subsystem keeps the transfer authorization. Therefore, for transfer of the other of A and B, a transfer request needs to be issued and the transfer subsystem has to wait for at least one clock cycle until it obtains the transfer authorization.

Furthermore, this arbitration circuit treats A transfer and B transfer equally, so that this arbitration circuit cannot sufficiently function when either of A and B has precedence over the other in transfer, such as when the program table graphics 1002 are more important than the background video images 1003 on the display screen shown in FIG. 10.

This is to say, the displayed pictures and audio change with time, so that even if a certain amount of data is lost, the current display can be prolonged to manage cases such as when the transfer of A is delayed. With picture, the receiving apparatus is able to abandon the data for the current display data and to request transfer of a further A transfer when the next data arrives. However, the receiving apparatus is unable to manage losses in graphics data.

(Arbitration Circuit of Digital Broadcast Receiving Apparatus of the Present Invention)

The arbitration circuit of the digital broadcast receiving apparatus of the present invention gives priority to more important transfer requests during transfer by using an improved arbitration circuit.

The following description concerns the arbitration circuit of the digital broadcast receiving apparatus of Embodiment 4, with reference to FIGS. 15–18.

The arbitration circuit 1615 realizes a function for receiving two types of data, namely video and audio data inputted from the serial parallel conversion circuit 1611 and graphics data inputted by the CPU 1609, and for transferring the received data to the local memory 1606 by arbitrating between the two kinds of data.

All pieces of the two types of data are inputted into the arbitration circuit 1615 with each piece of the data being associated with an address indicating where the data is to be stored in the local memory 1606.

Video and audio data which needs to be expanded is stored in the first area in the local memory 1606 and the first area is accessed by the AV decoder 1613. Graphics data which should be directly displayed by the display circuit 1614 is stored in the second area in the local memory 1606 and the second area is accessed by the display circuit 1614.

Therefore, the arbitration circuit 1615 judges and arbitrates the type of each piece of data by referring to the associated address before transferring the data.

Figure 15:
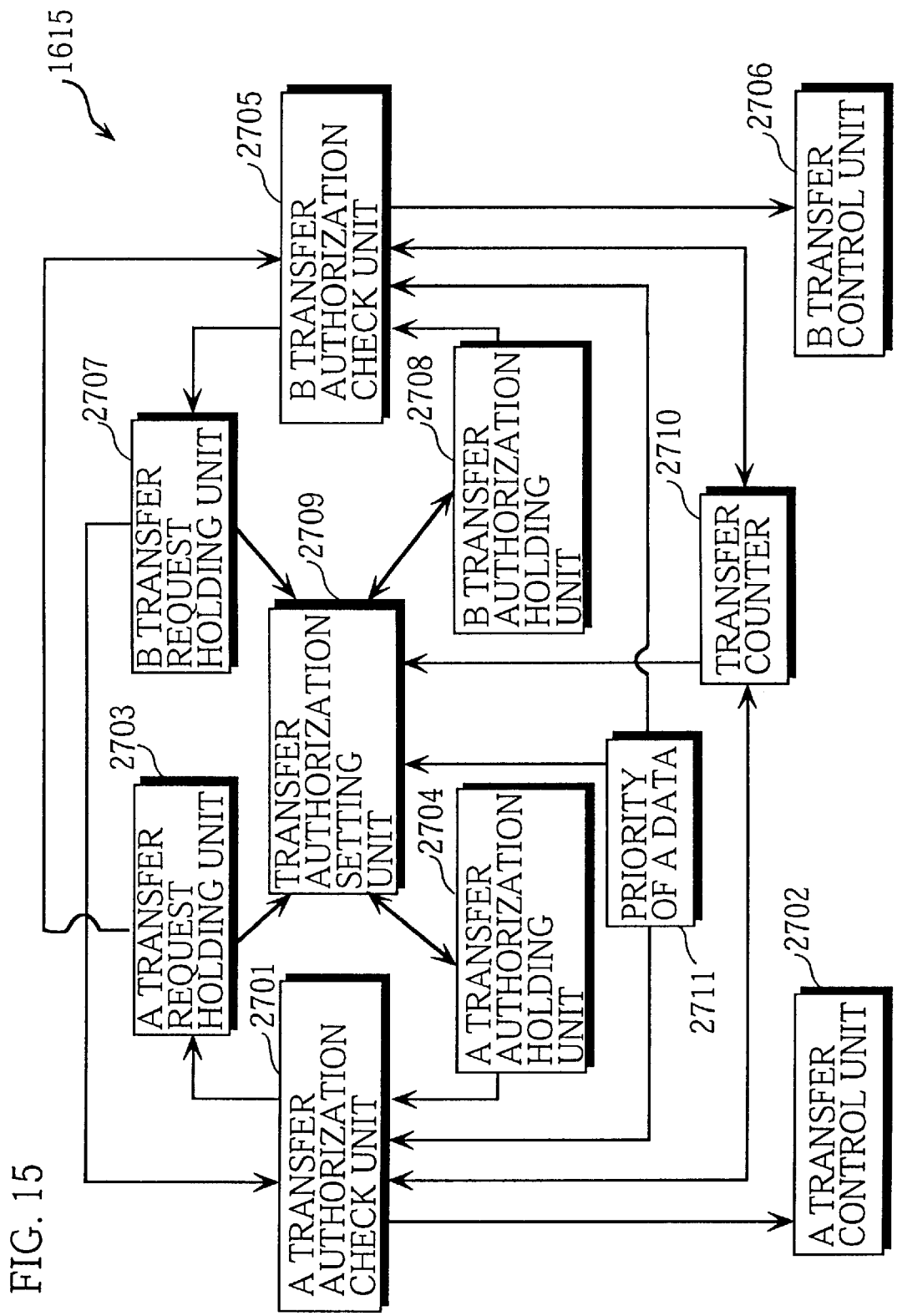
FIG. 15 is a functional block diagram of the arbitration circuit 1615 of the present invention.

FIG. 15 is a functional block diagram of the arbitration circuit 1615 of the present invention.

Picture and audio data is transmitted intermittently to the arbitration circuit 1615 at a certain transmission rate. Graphics data is intermittently transmitted to the arbitration circuit 1615.

In the following description, video and audio data is referred to as "A", transfer of video and audio data to the local memory 1606 "A transfer", graphics data "B", and transfer of graphics data to the local memory 1606 "B transfer".

The arbitration circuit 1615 includes: the transfer counter 2710 for counting the number of transfer clock cycles during the A or B transfer; the A transfer control unit 2702 for controlling the A transfer; the B transfer control unit 2706 for controlling the B transfer; the A transfer authorization check unit 2701 for checking whether A transfer is possible and, if so, instructing the A transfer control unit 2702 to perform the A transfer; the B transfer authorization check unit 2705 for checking whether B transfer is possible and, if so, instructing the B transfer control unit 2706 to perform the B transfer; the A transfer authorization holding unit 2704 for holding an A transfer authorization; the B transfer authorization holding unit 2708 for holding a B transfer authorization; the transfer authorization setting unit 2709 for setting a value indicating that one of the A transfer authorization holding unit 2706 and the B transfer authorization holding unit 2708 has the transfer authorization and setting a value indicating no transfer authorization in the other of the A and B transfer authorization holding units; the A transfer request holding unit 2703 for holding a transfer authorization request from the A transfer authorization check unit 2701; the B transfer request holding unit 2707 for holding a transfer authorization request from the B transfer authorization check unit 2705; and the priority holding unit 2711 for holding a value indicating one of A and B has precedence over the other to be processed.

The value of the transfer counter 2710 is set to a value obtained by subtracting 1 from the number of block cycles in one processing unit when the A transfer control unit 2702 or the B transfer control unit 2706 performs transfer. The value is decremented by one in each clock cycle. If one processing unit for the A transfer and the B transfer is act at 2 clock cycles, the transfer counter is set to 1 when transfer is commenced.

Here, video and audio data needs to be transferred at a predetermined transfer rate so that the A transfer cannot wait until the B transfer is completed. Therefore, the A transfer and the B transfer are each divided into certain processing units and are processed in the processing units. When the A and B transfer requests are issued at the same time, the A and B transfers are alternatively processed for a given processing amount.

Figure 16:
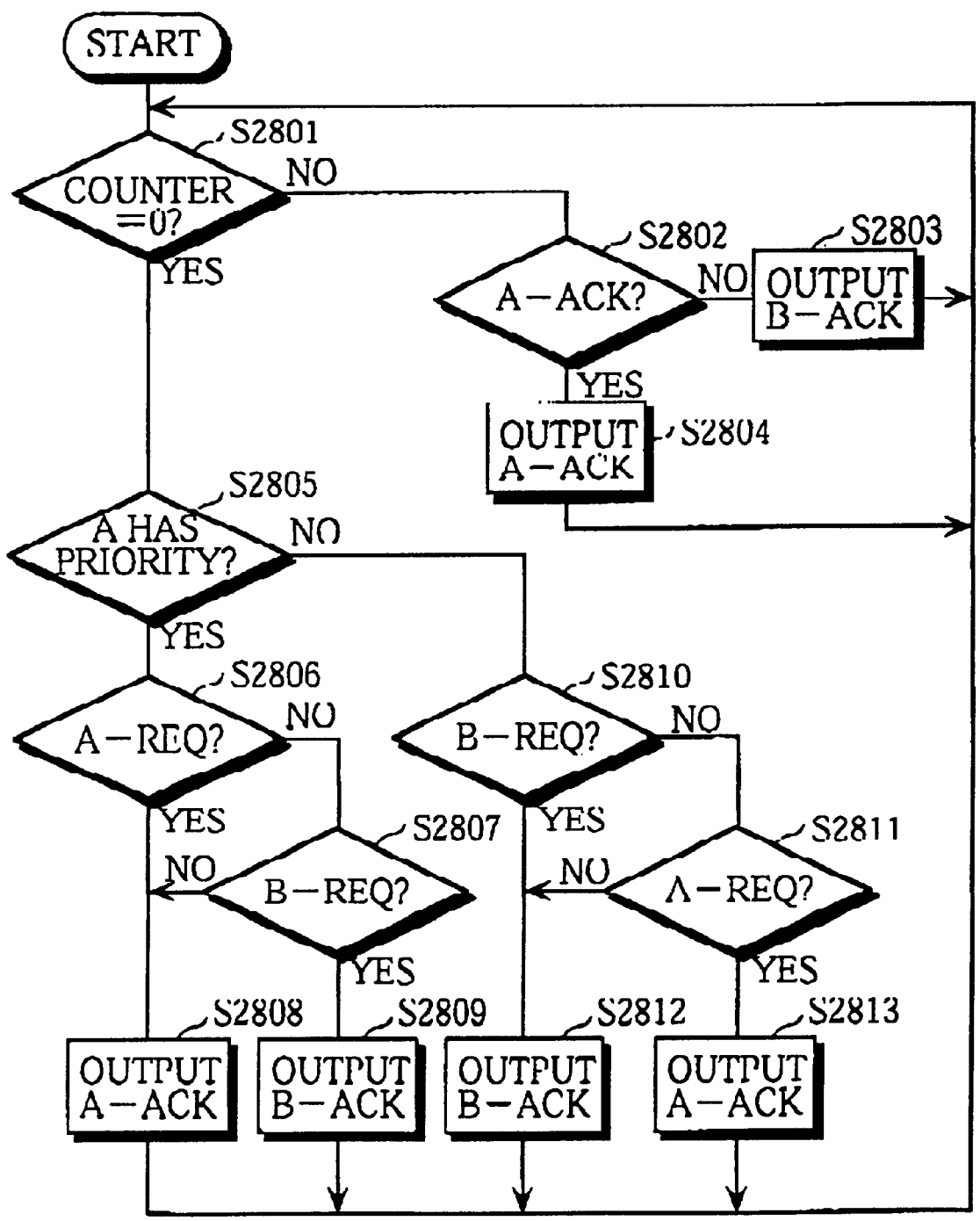
FIG. 16 is a flowchart showing the process flow of the transfer authorization setting unit 2709 of the arbitration circuit 1615.

FIG. 16 is a flowchart showing the process flow of the transfer authorization setting unit 2709 of the arbitration unit 1615.

The flow loops once in one clock cycle.

In the flow, the A-REQ is a signal indicating that an A transfer request has been issued, the B-RBQ is a signal indicating that a B transfer request has been issued, the A-ACE is a signal indicating an A transfer authorization, and the R-ACK is a signal indicating a B transfer authorization.

When the transfer counter 2710 is not 0, values of the A and B transfer authorization holding units 2704 and 2708 are maintained (steps S2801, S2802, S2803, and S2804).

When the transfer counter 2710 is 0, the value of the priority holding unit 2711 indicates that A has priority, and an A transfer request has been issued to the A transfer request holding unit 2703, a value indicating the transfer authorization is set in the A transfer authorization holding unit 2704 (steps S2801, S2805, S2806, and S2808).

When the transfer counter 2710 is 0, the value of the priority holding unit 2711 indicates that A has priority, an A transfer request has not been issued to the A transfer request holding unit 2703, and a B transfer request has been issued to the B transfer request holding unit 2707, a value indicating the transfer authorization is set in the B transfer authorization holding unit 2708 (steps S2801, S2605, S2808, S2807, and S2808).

When the transfer counter 2710 is 0, the value of the priority holding unit 2711 indicates that A has priority, an A transfer request has not been issued to the A transfer request holding unit 2703, and a B transfer request has not been issued to the B transfer request holding unit 2707, a value indicating the transfer authorization is set in the A transfer authorization holding unit 2704 (steps S2801, S2805, S2806, S2807, and S2808).

When the transfer counter 2710 is 0, the value of the priority holding unit 2711 indicates that A does not have priority, and a B transfer request has been issued to the B transfer request holding unit 2707, a value indicating the transfer authorization is set in the B transfer authorization holding unit 2708 (steps S2801, S2805, S2810, and S2812).

When the transfer counter 2710 is 0, the value of the priority holding unit 2711 indicates that A does not have priority, a B transfer request has not been issued to the H transfer request holding unit 2707, and an A transfer request has been issued to the A transfer request holding unit 2703, a value indicating the transfer authorization is set in the A transfer authorization holding unit 2704 (steps S2801, S2805, S2810, S2811, and S2813).

When the transfer counter 2710 is 0, the value of the priority holding unit 2711 indicates that A does not have priority, a B transfer request has not been issued to the B transfer request holding unit 2707, and on A transfer request has not been issued to the A transfer request holding unit 2703, a value indicating the transfer authorization is set in the B transfer authorization holding unit 2708 (steps S2801, S2805, S2810, S2811, and S2812).

Figure 17:
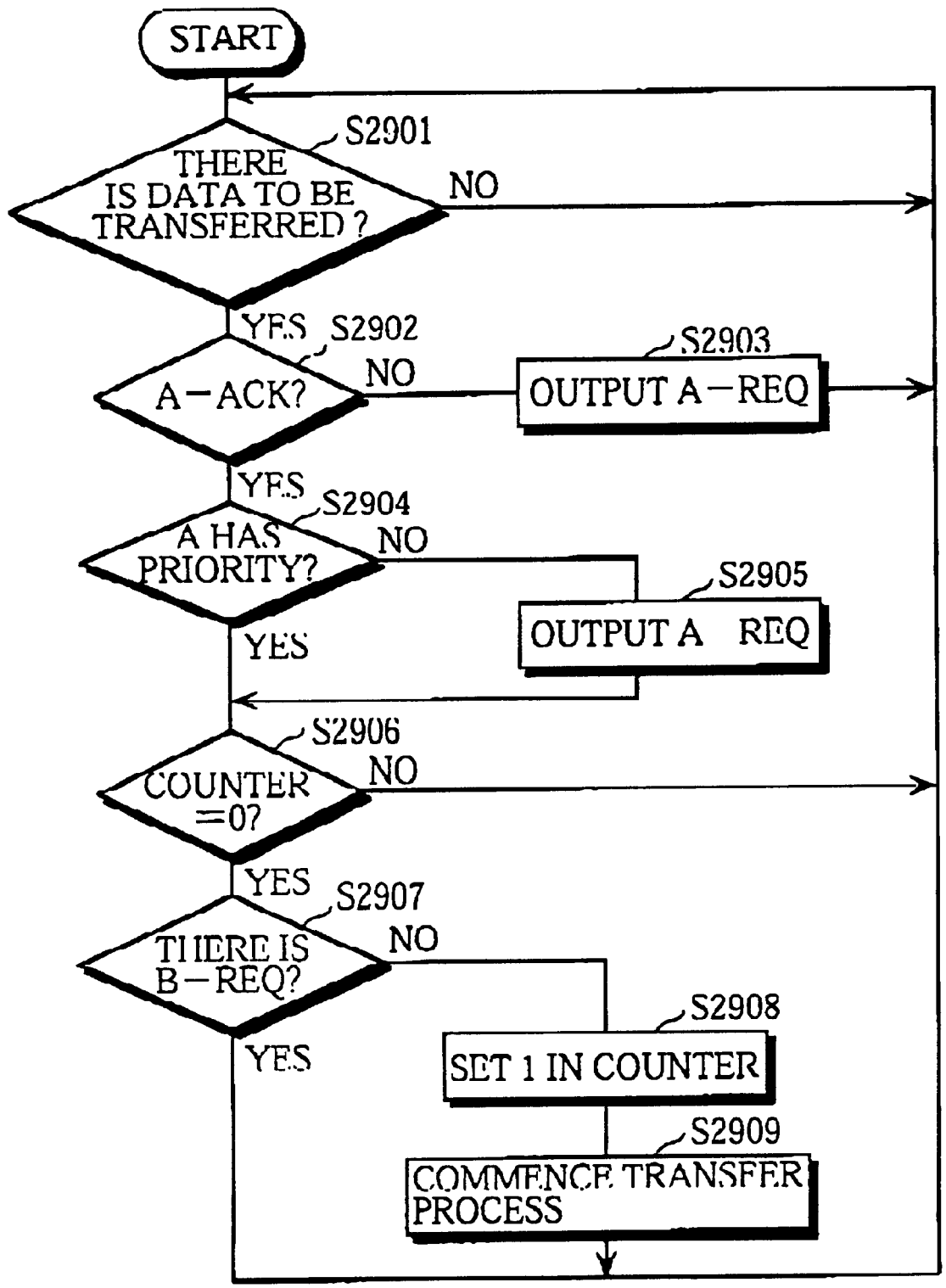
FIG. 17 is a flowchart showing the process flow of the A transfer authorization check unit 2701 of the arbitration circuit 1615.

FIG. 17 is a flowchart showing the process flow of the A transfer authorization check unit 2701 of the arbitration circuit 1615.

The flow loops once in one clock cycle.

When there is data to be transferred and there is no value indicating the transfer authorization in the A transfer authorization holding unit 2704, a value indicating a transfer request is set in the A transfer request holding unit 2703 (steps S2901, S2902, and S2903).

When there is data to be transferred, there is a value indicating the transfer authorization in the A transfer authorization holding unit 2704, and the priority holding unit 2711 holds a value indicating that A does not have priority, a value indicating a transfer request is set in the A transfer request holding unit 2703 (steps S2901, S2902, S2904, and S2905).

When there is data to be transferred, there is a value indicating the transfer authorization in the A transfer authorization holding unit 2704, the priority holding unit 2711 holds a value indicating that A has priority, the transfer counter 2710 is 0, and the B transfer request holding unit 2707 does not hold a value indicating a transfer request, the value 1 obtained by subtracting 1 from the number of 2 clock cycles in one processing unit is set in the transfer counter 2710 to commence A transfer under the control of the A transfer control unit 2702 (steps S2901, S2902, S2904, S2906, S2907, S2908, and S2908).

Note that the process low of the B transfer authorization check unit 2705 is the flow in FIG. 17 with A and B interchanged, so that this is not described here.

The following is a description of the process timing of the A transfer and the B transfer with the arbitration circuit 1615 having the above structure and process flow.

Figure 18:
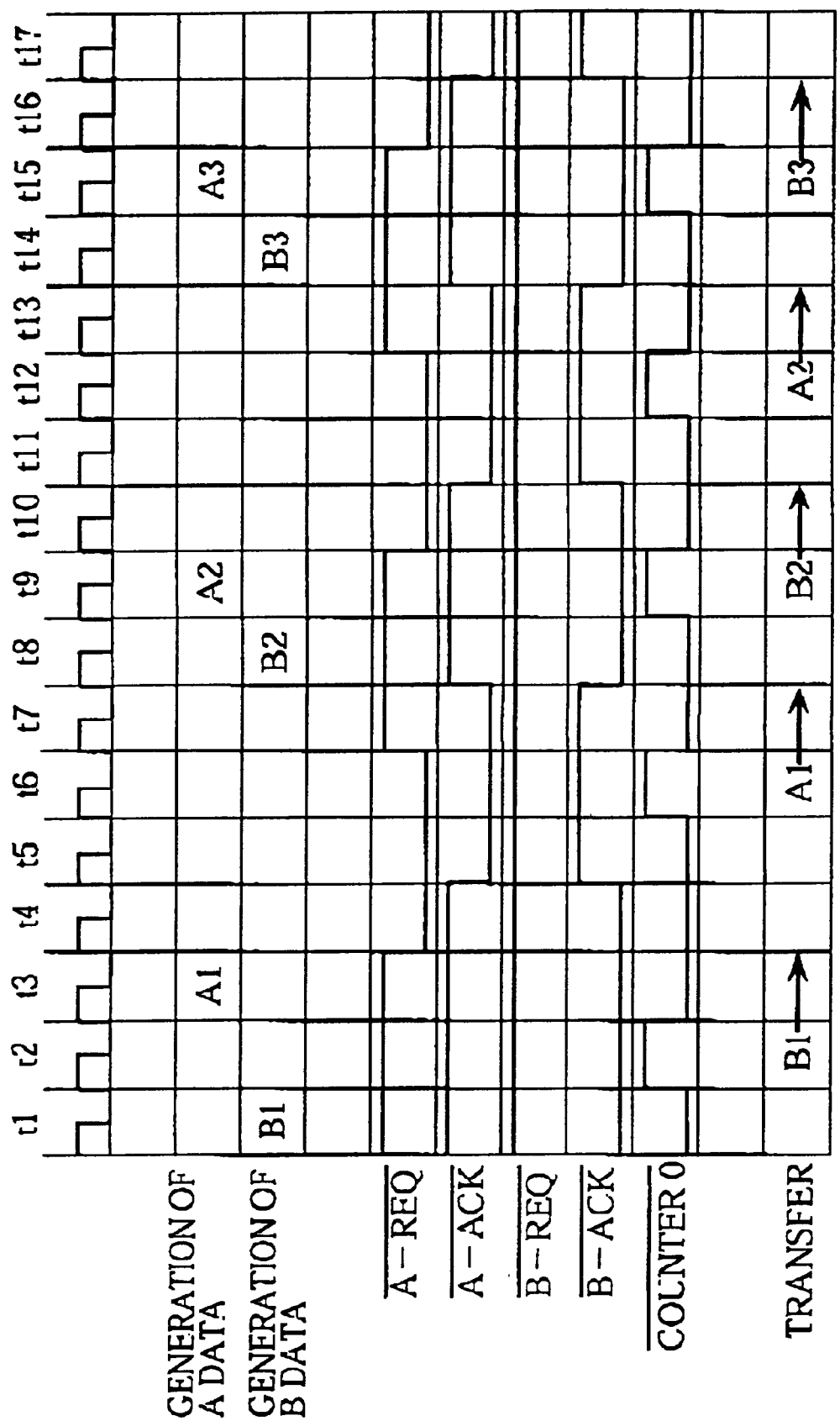
FIG. 18 shows timing of process by the arbitration circuit 1615.

FIG. 18 shows the process timing of the arbitration circuit 1615.

This description concerns the case where B has priority.

A transfer requests are intermittently issued without regard to the time taken by the A transfer. When the A transfer is performed slowly, that is, when there is a long time laq between the transfer request issuance and the transfer completion due to the arbitration circuit making the transfer request wait, there are cases where the data requested by the A transfer is abandoned. However, even if some video data is abandoned, this will only result in a slight reduction in the quality of the displayed images.

Graphics data, meanwhile, is generated by the CPU 1609 and so is not sent from the outside. Therefore, when B transfer is performed at high speed, next B transfer request is issued immediately; when B transfer is performed slowly, next B transfer request is issued after a long time. Also, the data for B is not abandoned.

In t1, B1 is generated and B had already obtained the transfer authorization (B-ACE), so that B1 is transferred in 2 clock cycles of t2 and t3.

In t3, A1 is generated and A does not have the transfer authorization (A-ACE), so that a transfer request (A-REQ) is issued in t4.

In t4, the counter is 0, so that A is given the transfer authorization (A-ACK) corresponding to the issued transfer request (A-REQ) in t5.

In t5, A has already obtained the transfer authorization (A-ACK), so that A1 is transferred in 2 clock cycles of t6 and t7.

In 57, the counter is 0 and neither an A transfer request (A-RBQ) not a B transfer request (B-RBQ) has been issued, so that B having priority is given the transfer authorization (B-ACK) in t8.

In t8 when 5 clock cycles have passed after the transfer of B1 is completed (t3), B2 is generated and B has already obtained the transfer authorization (B-ACK), S0 that S2 is transferred in 2 clock cycles of t9 and t10.

In the same way, A2 generated in t3 is transferred in 2 clock cycles of t12 and t13, and B3 generated in t14 when 4 clock cycles have passed since the transfer of B2 is completed (T10) is transferred in 2 clock cycles of t15 and t16.

Accordingly, B1, B2, and B3 will have been transferred by t16 with the arbitration circuit 1615. On the other hand, the transfer processes will not have been completed by t17 with the arbitration circuit 1700.

As described above, with the arbitration circuit 1615, the transfer authorization is given to B even after A transfer was performed because B is given transfer priority. Therefore, when a transfer needs to be performed after A transfer was performed, the B transfer can be performed without transfer request issuance. As a result, the arbitration circuit 1615 can shorten a time lag between the issuance of a B transfer request and the switching of the transfer authorization to R, in comparison with the conceivable arbitration circuit 1700.

With the arbitration circuit 1615, when graphics data of still images and compressed other picture data, such as compressed video data, are transferred to the local memory 1606, the graphics data of still images can have transfer priority. Therefore, when still images are superimposed and displayed on video images, the still images receive priority for being displaced. That is, even still images and other pictures are superimposed and displayed as in Embodiment 3, the still images can be displayed at high speed.

<Embodiment 5>

The following is a description of the digital broadcast receiving apparatus of Embodiment 5 of the present invention.

Figure 19:
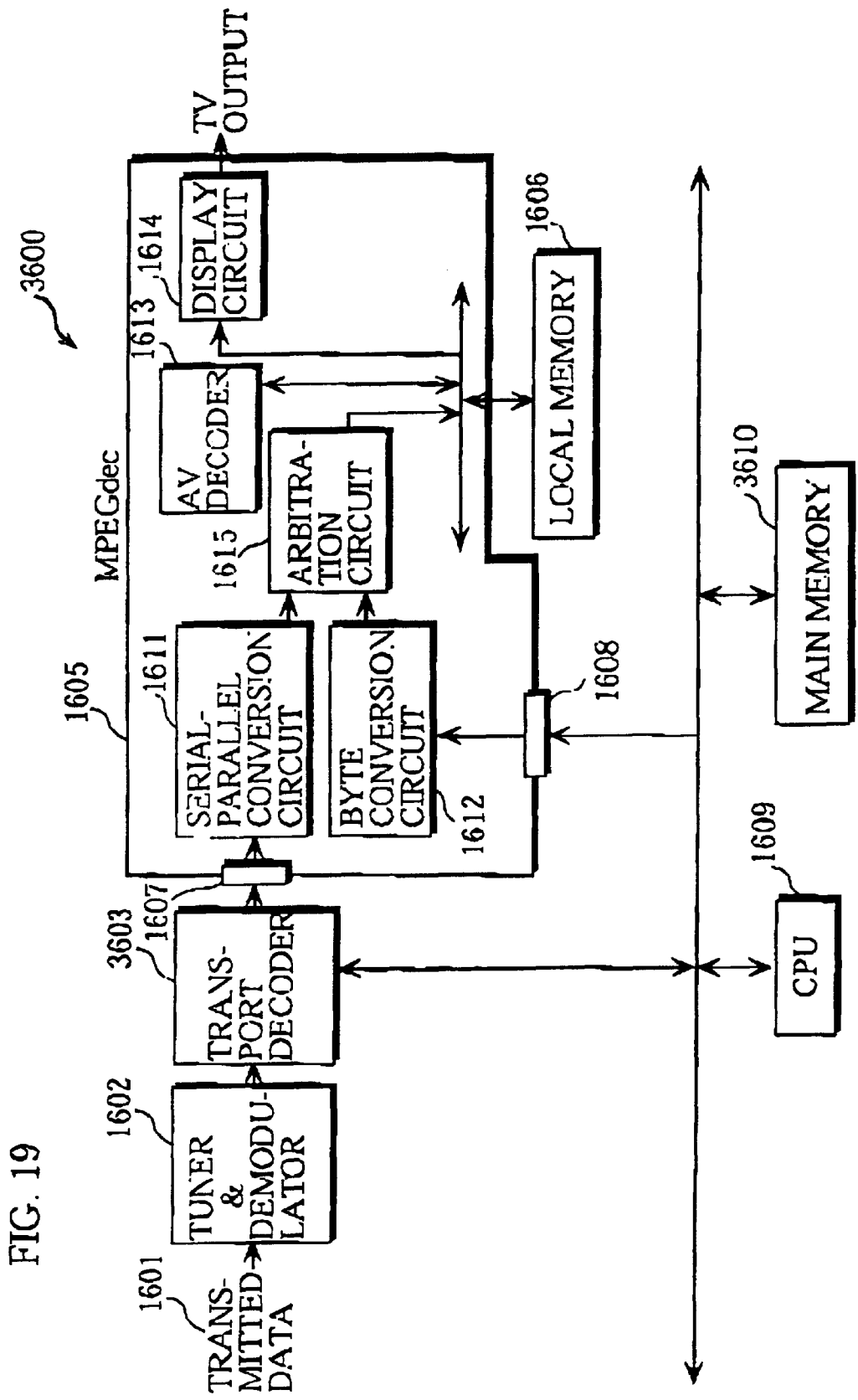
FIG. 19 is a block diagram showing the structure of the digital broadcast receiving apparatus 3600 of Embodiment 5.

FIG. 19 is a block diagram showing the structure of the digital broadcast receiving apparatus 3600 at Embodiment 5.

The digital broadcast receiving apparatus of Embodiment 5 is a modification of the digital broadcast receiving apparatus of Embodiments 3 and 4, and includes the tuner & demodulator 1602 for selecting and demodulating transmitted data, the transport decoder 3603 for separating "image" packets, "audio" packets, and "data" packets for transport streams, the MPEG decoder 1605, the local memory 1606 attached to the MPEG decoder 1605, the CPU 1609 for controlling each unit of the digital broadcast receiving apparatus, and the main memory 3610 accessed by the CPU 1609.

In the figure, components of the digital broadcast receiving apparatus 3600 which are the same as those of the digital broadcast receiving apparatus 1600 in FIG. 9 are given the same numbers.

The digital broadcast receiving apparatus 3600 is significantly different from the digital broadcast receiving apparatus 1600 of Embodiments 3 and 4 in that the digital broadcast receiving apparatus 3600 does not include the local memory 604. To achieve the same functioning as the digital broadcast receiving apparatus 1600 without the local memory 604, the main memory 3610 of the digital broadcast receiving apparatus 3600 stores a program executed by the CPU 1609. The transport decoder 3603 also has a function for extracting necessary data out of data imputted from the tuner & demodulator 1602 and for storing the estracted data in the main memory 3610 under the control of the CPU 1609.

The following description concerns the procedure of the digital broadcast receiving apparatus 3600 of Embodiment 5 for storing received still image data in the main memory 3610.

Immediately after the digital broadcast receiving apparatus 3600 is activated, the CPU 1608 informs the transport decoder 3603 of an address of a specific area in the main memory 3610.

The digital broadcast receiving apparatus 3600 receives and demodulates data repeatedly transmitted from a digital broadcast transmitting apparatus using the tuner & demodulator 1602 and sequentially inputs the demodulated data into the transport decoder 3603.

Under the control of the CPU 1609, the transport decoder 3603 identifies the necessary still image data out of the inputted data using PIDs, extracts the identified data, and transfers the extracted data to a specific area in the main memory 3610 using the address which has been indicated by the CPU 1609. Note that the function of the transport decoder 3603 for extracting data specified by the CPU 1609 out of inputted data is the same as that of the transport decoder 1603 of Embodiments 3 and 4.

In this manner, the digital broadcast receiving apparatus 3600 stores received still image data in the main memory 3610. Note that the procedure for storing the still image relation data in the main memory 3610 is the same as that for storing still image data described above.

The digital broadcast receiving apparatus of the present invention has been explained by means of the embodiments given above, although it should be obvious that several further modifications are possible. Thirteen examples of such are given below.

(1) In the embodiments, data of 150 still images and the still image relation data is transmitted repeatedly from a digital broadcast transmitting apparatus. However, 150 pairs of one piece of still image data and one piece of the still image relation data may be transmitted repeatedly. In this case, each piece of the still image relation data is link information showing still image this directly linked to the corresponding still image data.

Here, the link information specifies still image data to be displayed next so that each still image related to a current still image can be displayed according to operations made by a user. When the seventh still image is displayed and the user can select the eighth or ninth image, for instance, the link information includes numbers 8 and 9 for identifying the data of these still images.

If pairs of one piece of still image data and one piece of the still image relation data identifying link target still images are used, as described above, the digital broadcast receiving apparatus still performs a prediction control operation with almost the same procedure as the flowchart in FIG. 8. However, when still image data is fetched into the main memory, a piece of still image relation data corresponding to the still image data is also fetched into the main memory.

Note that even in this case, the digital broadcast receiving apparatus may fetch all pieces of still image relation data into the main memory, generate a still image information table described in the embodiments (see FIG. 7) from the fetched still image relation data, and perform the prediction control operation by referring to the generated still image information table.

(2) Although the still image relation data shown child still images of a still image in these embodiments, the still image relation data may further show information where the child still images are given in descending order of probability of selecting operation. For instance, the still image information table shown in FIG. 7 gives identification numbers of child still images, namely 2, 4, 5, 7, 11, and 50, of the still image whose identification number is 1. This still image information table may be generated by the digital broadcast transmitting apparatus in advance so that the identification numbers of child still images are arranged in descending order of probability of being selected by the user. In this case, still image data may be stored in the main memory according to the probabilities in step S58 of the prediction control operation of the CPU 609 shown in FIG. 8. Once overflow occurs in an area of the main memory for storing data of predicted still images, remaining still image data is not stored in the main memory. By doing so, even if an area in the main memory for storing still image data is very small, the probability that a still image selected by the user will be displayed at high speed can be increased.

(3) While data of 150 still images is transmitted from the digital broadcast transmitting apparatus in Embodiments 1 and 2, data of any number of still images, such as 200 still images or 300 still images, may be transmitted.

(4) In Embodiments 1 and 2, the digital broadcast transmitting apparatus repeatedly transmits data of 150 still images. However, an identical set of still images does not need to be repeatedly transmitted so that the transmitted still images may be changed. In the case of a weather forecast, for instance, still images may be changed once every three hours to provide the latest information. In this case, the main memory 610 stores a processing program for replacing still image data stored in the main memory 610 with transmitted new still image data at a certain interval, and the CPU 629 executes the program.

(5) Although the digital broadcast receiving apparatus 600 temporarily stores still image data fetched from the local memory 604, the fetched still image data may be stored in the local memory 606 instead of the main memory 610.

(6) In Embodiment 1, the value of the output order deciding register 705 in the byte conversion circuit 612 is set by the initial setting program executed when the digital broadcast receiving apparatus 600 is activated, and is set according to the type of the CPU. When the type of the CPU is the big endian type, the value is set to 0; when the little endian type, the value is set to 1. However, the value of the output order deciding register 705 may be predetermined to 0 or 1. In this case, the digital broadcast receiving apparatus includes a CPU 609 conforming to the value of the output order deciding register 705.

(7) In Embodiment 1, 32-bit parallel data is inputted into the byte conversion circuit 612 and the CPU 609 deals with 4 bytes as one word. However, 8n bit data (where n is an integer greater than 2) may be inputted into the byte conversion circuit 612, and the CPU 609 may deal with any number of bytes as one word. When the data inputted into the byte conversion circuit 612 corresponds to the word length of the CPU 609, the CPU 609 can transfer data, such as still image data, from the main memory 610 to the local memory 606 at high speed. When 32-bit parallel data is inputted into the byte conversion circuit 612 and the word length of the CPU 609 is 4 bytes, the CPU 609 can reach its full potential.

Also, the byte conversion circuit 612 may transfer data directly to the AV decoder 613, instead of to the local memory 606.

(8) In Embodiment 1, the main memory stores data of a still image, which is selected by the user and to be displayed, and data of child still images of the selected still image that are likely to be selected by the user to prepare for the next selecting operation by the user. However, the main memory may further store data of other child still images to prepare for any following selecting operations, such as the next selecting operation but one and for the next selecting operation but two.

For instance, to prepare for the next selecting operation but one, all identification numbers of child still images of the Mth still image and child still images of the child still images are obtained as the array variable N by referring to the still image information table in step 552. Note that, in this case, the capacity of an area for storing still image data in the main memory 610 needs to be increased to store data of many still images.

(9) During the prediction control operation of the CPU 609 (see FIG. 8) in Embodiment 1, whenever data of one child still image has been fetched into the main memory in step S58, it is judged whether the user has performed a selecting operation in step S56. However, the still image data fetching process may be terminated as soon as the user performs a selecting operation, and the process may proceed to step S59.

(10) In Embodiment 4, when still image data is expanded by a program executed by the CPU 1609 as in Embodiment 3 and is outputted together with an address specification of the second area n the local memory 1606, the arbitration circuit 1615 stores the expanded still image data in the second area in the local memory 1606. As a result, the expanded still image data is displayed by the display circuit 1614.

In another embodiment, the still image data may be outputted together with an address specification of the first area in the local memory 1606 without being expanded by a program executed by the CPU 1609. In this case, the arbitration circuit 1615 transfers the still image data to the first area in the local memory 1606 so that the still image data is expanded by the AV decoder 1613 and is displayed by the display circuit 1614. Note that the CPU 1609 can input still image data into the arbitration circuit 1615 via the byte conversion circuit 1612 only when video and audio data is not inputted into the arbitration circuit 1615.

(11) While the time period for executing each processing unit of A and B transfer is set to 2 clock cycles in Embodiment 4, the time period may be set to any number of clock cycles. Also, the time period for executing a processing unit of A transfer may be different from that of a transfer.

(12) Although the transfer counter 2710 is used to detect the completion of transfer execution in each processing unit in Embodiment 4, any other circuit may be used as far as it shows whether transfer in each processing unit is being performed. For instance, a circuit that holds 1 during processing units where transfer execution is being performed and holds 0 otherwise may be used.

(13) While Embodiment 4 concerns the case where B has transfer priority, the value of the priority holding unit 2711 of the arbitration circuit 1615 may be changed at any time.

What is claimed is:

1. A digital broadcast receiving apparatus for receiving a plurality of pieces of still image data which are repeatedly transmitted from a digital broadcast transmitting apparatus and for displaying a still image selected by a user, the receiving apparatus comprising:

a storage means;

a receiving means for sequentially receiving the plurality of pieces of still image data;

a prediction means for predicting at least one piece of still image data which is likely to be specified by the user before the user specifies the piece of still image data;

a still image fetching means for fetching, into the storage means, every piece of still image data that has been predicted by the prediction means out of the plurality of pieces of still image data received by the receiving means;

an operation accepting means for accepting a selecting operation of a still image by the user, the selecting operation specifying a piece of still image data corresponding to the selected still image; and a display means for processing the specified piece of still image data out of the still image data in the storage means and for displaying a still image according to the processed still image data.

2. The digital broadcast receiving apparatus defined in claim 1, wherein the receiving means further receives link information and stores the ink information in the storage means, the link information showing which still images are selectable by the user during a display of each still image; and the prediction means predicts at least one piece of still image data which is likely to be specified by the user by referring to the link information stored in the storage means.

3. The digital broadcast receiving apparatus defined in claim 2, wherein the prediction means refers to the link information and a still image currently being displayed, and predicts at least one piece of still image data which is likely to be specified in a following selecting operation.

4. The digital broadcast receiving apparatus defined in claim 3, wherein the operation accepting means accepts the selecting operation by the user even while the still image fetching means is fetching still image data into the storage means;

the prediction means invalidates a result of a previous prediction when a still image selected by the user has been displayed by the display means as a result of the selecting operation accepted by the operation accepting means, and commences a new prediction; and the still image fetching means, when the operation accepting means accepts the selecting operation and still image data specified by the selecting operation has not been stored in the storage means, fetches the specified still image data in the storage means, and, when the prediction means invalidates the result of the previous prediction and commences the now prediction, fetches newly predicted still image data into the storage means.

5. The digital broadcast receiving apparatus defined in claim 4, wherein the still image data transmitted from the digital broadcast transmitting apparatus is subjected to digital compression;

the display means includes:

a display data storage unit for storing data to be displayed;

an expansion unit for expanding still image data; and an image display unit for displaying an image according to the data stored in the display data storage unit; and wherein the display means expands still image data specified by the user using the expansion unit, stores the expanded still image data in the display data storage unit, and displays a still image according to the expanded still image data using the image display unit.

6. The digital broadcast receiving apparatus defined in claim 5, wherein the expansion unit executed a computer program to expand still image data specified by the user;

the still image data is transmitted with picture data from the digital broadcast transmitting apparatus, the picture data and the still image data being to be superimposed and displayed;

the digital broadcast receiving apparatus further comprises:

a picture receiving means for receiving the picture data;

the display means further includes:

a transfer control unit for performing a first transfer for transferring the expanded still image data to the display data storage unit and a second transfer for transferring the received picture data to the display data storage unit by arbitrating between the first transfer and the second transfer; wherein the transfer control unit includes:

a transfer necessity detection unit for detecting whether the first transfer is necessary and detecting whether the second transfer is necessary;

a transfer authorization unit for giving exclusively a transfer authorization to either of the first transfer and the second transfer; and a transfer performing unit for performing either of the first transfer and the second transfer which has been detected as being necessary and has been given the transfer authorization by the transfer authorization unit; wherein when the transfer necessity detection unit detects that one of the first transfer and the second transfer is necessary, the transfer authorization unit gives the transfer authorization to the one of the first transfer and the second transfer;

when both of the first transfer and the second transfer are detected as being necessary, the transfer authorization unit gives the transfer authorization to a first of the first transfer and the second transfer to be detected as being necessary; and when neither the first transfer nor the second transfer is detected as being necessary, the transfer authorization unit gives the transfer authorization to the first transfer.

7. The digital broadcast receiving apparatus defined in claim 5, wherein the image display unit includes:

a transfer unit for transferring still image data specified by the user from the storage means to the expansion unit; wherein the transfer unit includes:

an input buffer for temporarily holding n pieces of inputted 8-bit data (n being an integer no less than 2);

a CPU, which handles n bytes as one word, for fetching the still image data specified by the user from the storage means and storing the fetched still image data in the input buffer n bytes at a time;

a counter for counting either of from 0 to (N−1) and from (n-1) to 0;

an output order storage unit for storing a value showing a counting order of the counter beforehand;

a data selection unit for selecting one out of the n pieces of 8-bit data stored in the input buffer according to a value of the counter; and a data output unit for transferring the 8-bit data selected by the data selection unit to the expansion unit.

8. The digital broadcast receiving apparatus defined in claim 3, wherein the link information is repeatedly transmitted from the digital broadcast transmitting apparatus; and the receiving means receives the link information and stores the link information into the storage means only once.

9. The digital broadcast receiving apparatus defined in claim 3, wherein the ink information is composed of a plurality of pieces of link data which each are related to one piece of the still image data and show which still images are selectable by the user during a display of a still image according to the piece of still image data;

the plurality of pieces of link data are repeatedly transmitted from the digital broadcast transmitting apparatus;

the receiving means receives the plurality of pieces of link data transmitted from the digital broadcast transmitting apparatus and sequentially stores the plurality of pieces of link data in the storage means; and the prediction means predicts at least one piece of still image data which is likely to be specified in a next selecting operation, by referring to one out of the plurality of pieces of link data related to data of a still image currently being displayed.

10. A digital broadcast receiving apparatus for receiving a plurality of pieces of still image data which have been subjected to digital compression and are repeatedly transmitted from a digital broadcast transmitting apparatus and for outputting an image signal for displaying a still image selected by a user, the receiving apparatus comprising:

a storage means;

a receiving means for sequentially receiving the plurality of pieces of still image data;

a prediction means for predicting at least one piece of still image data which is likely to be specified by the user;

a still image fetching means for fetching, into the storage means, every piece of still image data that has been predicted by the prediction means out of the plurality of pieces of still image data received by the receiving means;

an operation accepting means for accepting a selecting operation of a still image by the user, the selecting operation specifying a piece or still image data corresponding to the selected still image; and an expansion output means for expanding the specified still image data out of the still image data in the storage means and for outputting an image signal of the expanded still image data.

11. The digital broadcast receiving apparatus defined in claim 10, wherein the receiving means further receives link information and stores the link information in the storage means, the link information showing which still images are selectable by the user while an image signal of each still image is being outputted; and the prediction means predicts at least one piece of still image data which is likely to be specified by the user, by referring to the link information stored n the storage means.

12. A digital broadcast receiving apparatus for receiving first type data and second type data transmitted from a digital broadcast transmitting apparatus and for outputting signals according to the first type data and the second type data, the receiving apparatus comprising:

a signal output means for outputting a signal according to inputted data;

a receiving means for receiving data including the first type data and the second type data;

a first extracting means for extracting the first type data out of the data received by the receiving means;

a second extracting means for extracting the second types data out of the data received by the receiving means;

a transfer control means for performing a first transfer for transferring the first type data from the first extracting means to the signal output means and for performing a second transfer for transferring the second type data from the second extracting means to the signal output means by arbitrating between the first transfer and the second transfer; wherein the transfer control means includes:

a transfer necessity detection unit for detecting whether the first transfer is necessary and detecting whether the second transfer is necessary;

a priority information storage unit for storing priority information showing which of the first transfer and the second transfer has transfer priority;

a transfer authorization unit for giving exclusively a transfer authorization to either of the first transfer and the second transfer; and a transfer performing means for performing either of the first transfer and the second transfer which has been detected as being necessary and has been given the transfer authorization by the transfer authorization unit, wherein when the transfer necessity detection unit detects that one of the first transfer and the second transfer is necessary, the transfer authorization unit gives the transfer authorization to the one of the first transfer and the second transfer;

when both of the first transfer and the second transfer are detected as being necessary, the transfer authorization unit gives the transfer authorization to a first of the first transfer and the second transfer to be detected as being necessary; and when neither the first transfer nor the second transfer is detected as being necessary, the transfer authorization unit gives the transfer authorization to either of the first transfer and the second transfer by referring to the priority information.

13. The digital broadcast receiving apparatus defined in claim 12, wherein the first type data is graphics data for displaying graphics;

the second type data is video data for displaying video images;

the priority information stored in the priority information storage unit shows that transfer of the graphics data has the transfer priority;

the transfer authorization unit gives the transfer authorization to the first transfer when the transfer necessity detection unit detects that neither the first transfer nor the second transfer is necessary; and the signal output means outputs an image signal for images where graphics and video images are superimposed according to inputted graphics data and video data.

* * * * *

UNITED STATES PATENT AND TRADEMARK OFFICE
CERTIFICATE OF CORRECTION

PATENT NO. : 6,424,380 B1
DATED : July 23, 2002
INVENTOR(S) : Masataka Osaka

It is certified that error appears in the above-identified patent and that said Letters Patent is hereby corrected as shown below:

Column 30,
Line 20, delete "(N-1)" and insert -- (n-1) --.

Signed and Sealed this

Seventeenth Day of December, 2002

JAMES E. ROGAN
*Director of the United States Patent and Trademark Office*